US008392636B2

(12) United States Patent
Fritz et al.

(10) Patent No.: US 8,392,636 B2
(45) Date of Patent: Mar. 5, 2013

(54) VIRTUAL MULTIPLE INSTANCE EXTENDED FINITE STATE MACHINES WITH WAIT ROOMS AND/OR WAIT QUEUES

(75) Inventors: Rolf K. Fritz, Boeblingen (DE); Ulrich Mayer, Weil (DE); Thomas Schlipf, Boeblingen (DE); Stephan Christopher Smith, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 12/546,852

(22) Filed: Aug. 25, 2009

(65) Prior Publication Data

US 2011/0055842 A1    Mar. 3, 2011

(51) Int. Cl.
*G06F 3/00* (2006.01)
*G06F 5/00* (2006.01)
*G06F 7/38* (2006.01)
*H03K 19/173* (2006.01)

(52) U.S. Cl. ............................................ 710/54; 326/46
(58) Field of Classification Search ........................ None
See application file for complete search history.

(56) References Cited

U.S. PATENT DOCUMENTS 6,553,531 B1 *   4/2003   Kim et al. ...................... 714/739
2005/0204058 A1 *   9/2005   Philbrick et al. ............... 709/238

OTHER PUBLICATIONS

U.S. Appl. No. 12/546,772, filed Aug. 25, 2009.

* cited by examiner

*Primary Examiner* — Chun-Kuan Lee
*Assistant Examiner* — Ronald Modo
(74) *Attorney, Agent, or Firm* — Schmeiser, Olsen & Watts; Thomas E. Tyson

(57) ABSTRACT

A method and apparatus for processing data by a pipeline of a virtual multiple instance extended finite state machine (VMI EFSM). An input token is selected to enter the pipeline. The input token includes a reference to an EFSM instance, an extended command, and an operation code. The EFSM instance requires the resource to be available to generate an output token from the input token. In response to receiving an indication that the resource is unavailable, the input token is sent to a wait room or an initiative token containing the reference and the operation code is sent to a wait queue, and the output token is not generated. Without stalling and restarting the pipeline, another input token is processed in the pipeline while the resource is unavailable and while the input token is in the wait room or the initiative token is in the wait queue.

20 Claims, 15 Drawing Sheets

VIRTUAL MULTIPLE INSTANCE EXTENDED FINITE STATE MACHINES WITH WAIT ROOMS AND/OR WAIT QUEUES

FIELD OF THE INVENTION

The present invention relates to a data processing method and system for implementing a wait room and/or wait queue(s) in a pipelined virtual multiple instance extended finite state machine.

BACKGROUND OF THE INVENTION

A pipelined virtual multiple instance finite state machine (VMI FSM) runs multiple logical instances of a FSM concurrently. If a resource required by a FSM instance is unavailable at the target of an output token to be generated and sent by the FSM instance, then the output token cannot be sent to the target. If one of the FSM instances encounters a resource problem (i.e., a resource required by the FSM instance is unavailable) (e.g., a buffer is missing), conventional techniques stall the pipeline until the unavailable resource becomes available. Other FSM instances in the pipelined VMI FSM, however, cannot execute (i.e., cannot process input tokens) while the pipeline is stalled, even though the other FSM instances may not have the same resource unavailability problem because they are in a state that is different from the state of the FSM instance that has the resource unavailability problem. Similarly, a pipelined virtual multiple instance extended finite state machine (VMI EFSM) runs multiple logical instances of an EFSM concurrently and an output token cannot be sent to a target if a resource required by an EFSM instance is unavailable at the target, The VMI EFSM pipeline is stalled if a resource required by an EFSM instance is unavailable, thereby preventing other EFSM instances from executing, including any other EFSM instance that does not have the aforementioned resource unavailability problem. Thus, there exists a need to overcome at least one of the preceding deficiencies and limitations of the related art.

SUMMARY OF THE INVENTION

In first embodiments, the present invention provides a logic circuit-implemented method of processing data by a pipeline of a virtual multiple instance extended finite state machine (VMI EFSM). The method comprises:

receiving a plurality of input tokens referencing a plurality of EFSM instances included in the VMI EFSM;

selecting a first input token of the plurality of input tokens to enter the pipeline of the VMI EFSM, wherein the first input token includes a first field that includes a reference to a first EFSM instance of the plurality of EFSM instances, a second field that includes an extended command, and a third field that includes an operation code, and wherein a generation of a first output token from the first input token by the first EFSM instance requires a resource to be available;

receiving the first input token at the pipeline of the VMI EFSM;

fetching a current state of the first EFSM instance and one or more extended state variables of the first EFSM instance from an array based on the reference included in the first field of the first input token;

inserting the current state of the first EFSM instance and the one or more extended state variables of the first EFSM instance into one or more other fields of the first input token;

determining a next state of the first EFSM instance as an update of the current state;

receiving a first indication from a resource management support function that the resource is unavailable;

responsive to receiving the indication that the resource is unavailable, sending the first input token to a wait room, wherein the first output token is not generated by the first EFSM instance while the first input token is in the wait room and while the resource is unavailable;

writing the next state of the first EFSM instance to the array; and a logic circuit implementing the VMI EFSM processing one or more other input tokens in the pipeline while the first input token is in the wait room and while the resource is unavailable, wherein the processing of the one or more other input tokens includes generating one or more other output tokens without requiring the resource to be available.

In second embodiments, the present invention provides a logic circuit-implemented method of processing data by a pipeline of a virtual multiple instance extended finite state machine (VMI EFSM). The method comprises:

receiving a plurality of input tokens referencing a plurality of EFSM instances included in the VMI EFSM;

selecting a first input token of the plurality of input tokens to enter the pipeline of the VMI EFSM, wherein the first input token includes a first field that includes a reference to a first EFSM instance of the plurality of EFSM instances, a second field that includes an extended command, and a third field that includes an operation code, wherein a generation of a first output token from the first input token by the first EFSM instance requires a resource to be available, and wherein a processing of the extended command does not require the resource to be available;

receiving the first input token at the pipeline of the VMI EFSM;

fetching a current state of the first EFSM instance and one or more extended state variables of the first EFSM instance from an array based on the reference included in the first field of the first input token;

inserting the current state of the first EFSM instance and the one or more extended state variables of the first EFSM instance into one or more other fields of the first input token;

receiving a first indication from a resource management support function that the resource is unavailable;

responsive to the receiving the indication that the resource is unavailable, generating an initiative token containing the reference to the first EFSM instance and the operation code;

sending the initiative token to a wait queue, wherein the first output token is not generated by the first EFSM instance while the initiative token is in the wait queue and while the resource is unavailable;

determining a next state of the first EFSM instance as an update of the current state;

determining a next one or more extended state variables of the first EFSM instance as an update of the one or more extended state variables;

writing the next state of the first EFSM instance and the next one or more extended state variables of the first EFSM instance to the array; and a logic circuit implementing the VMI EFSM processing one or more other input tokens in the pipeline while the initiative token is in the wait queue and while the resource is unavailable, wherein the processing the one or more other input tokens includes generating one or more other output tokens without requiring the resource to be available.

Systems and logic circuits corresponding to the above-summarized methods are also described and claimed herein.

One or more embodiments of the present invention provide a technique for improving parallelism in a pipelined virtual multiple instance extended finite state machine by sending an input token that has a resource conflict to a wait room or by sending an initiative token derived from the input token to a wait queue to allow processing of other input tokens that do not have the same resource conflict, thereby avoiding the need to stall the pipeline.

DETAILED DESCRIPTION OF THE INVENTION

Overview

In embodiments of the present invention, an unavailability of a resource required by an instance of an EFSM in a pipelined VMI EFSM is addressed by implementing a wait room and/or a wait queue. As used herein, a VMI EFSM extends a VMI FSM by adding an extended command field to input tokens and adding extended state variables to a state array, where the VMI FSM is described in the patent application by Rolf Fritz et al., entitled "Efficiently Implementing a Plurality of Finite State Machines", filed on the same date hereof and incorporated herein by reference in its entirety. While processing an input token and in response to determining the unavailability of the resource required by the EFSM instance, an embodiment of the present invention inserts the input token in a wait room. While the input token is in the wait room, the output token cannot be sent to its target. In response to determining that the resource becomes available, the input token is dequeued from the wait room. In another embodiment, one or more wait queues are implemented instead of the wait room. The one or more implemented wait queues are associated with one or more required resources in a one-to-one correspondence. An initiative token is formed from the communication identifier and operation type code of the input token, and is inserted into a wait queue in response to determining that the required resource corresponding to the wait queue is unavailable. In response to determining that the resource becomes available, the initiative token is dequeued from the wait queue and is placed in an input queue to be processed by the pipelined VMI EFSM to generate and send an output token. In yet another embodiment, both wait queues and a wait room are implemented.

System for Implementing Virtual Multiple Instance FSMs

Figure 1:
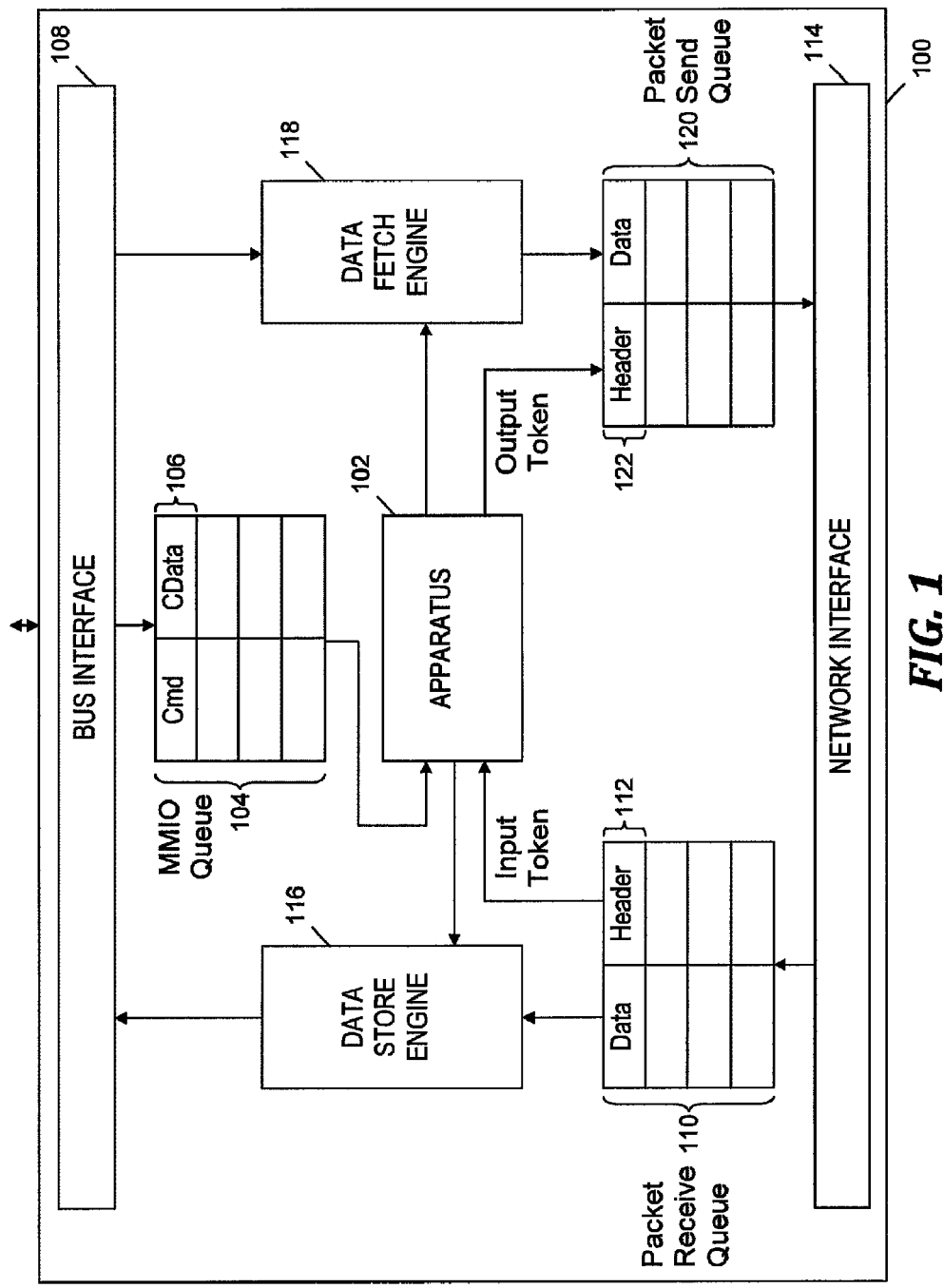
FIG. 1 is a block diagram of a system that includes an apparatus that implements a pipelined virtual multiple instance extended finite state machine, in accordance with embodiments of the present invention.

FIG. 1 is a block diagram of a system that includes an apparatus that implements a pipelined virtual multiple instance extended finite state machine, in accordance with embodiments of the present invention. System 100 is an environment that includes an apparatus 102 that implements the pipelined VMI EFSM with a wait room or a wait queue, as disclosed herein. In one embodiment, the pipelined VMI EFSM implemented by apparatus 102 processes networking protocols in networking adapters (e.g., InfiniBand, Peripheral Component Interconnect (PCI) Express, Fibre Channel or Ethernet), where system 100 is a networking adapter. A memory-mapped input/output (MMIO) queue 104 is included in a MMIO unit (not shown) in system 100 that manages MMIO operations issued by a central processing unit (CPU) to a networking adapter. MMIO operations in a first category prepare the networking adapter to receive incoming packets from the link (i.e., the set of wires (not shown) coming out of network interface 114). In one embodiment, the MMIO operations in the first category provide descriptors for the memory locations to which the received packets are to be written. MMIO operations in a second category trigger the networking adapter to send outgoing packets to the link. In one embodiment, the MMIO operations in the second category provide descriptors for the memory locations from which the packets to be sent are to be fetched.

MMIO queue 104 includes all commands sent by a processor. An entry 106 in MMIO queue 104 includes a first field having a command (i.e., Cmd) issued by the PU and a second field having Control Data (CData), which includes data to be written into one or more registers. In one embodiment, the commands (e.g., the Cmd in entry 106) in the MMIO queue 104 include (1) the MMIO operations that specify descriptors (e.g., Receive-Descriptor) for the memory locations to which data in received packets are to be written and (2) other MMIO operations that specify descriptors (e.g., Send-Descriptor) for the memory locations from which data for packets to be sent are fetched. Entries in MMIO queue 104 are received from a bus interface 108 and are received by apparatus 102.

A packet receive queue 110 includes entries that comprise received packets (i.e., packets received by system 100 via network interface 114; e.g., packets received by a networking adapter). Packet receive queue 110 is a queue structure in memory used for the receive processing task. An entry 112 in packet receive queue 110 includes a first field having data (i.e., Data in entry 112) and a second field having header information (i.e., Header in entry 112). Entries in packet receive queue 110 are received from a network interface 114.

Data in entry 112 is sent to data store engine 116. The header information in entry 112 is sent in an input token to apparatus 102.

Data store engine 116 writes (i.e., stores) data of the received packets in memory locations specified by MMIO operations in MMIO queue 104. In one embodiment, data store engine 116 is a unit included in a networking adapter.

Data fetch engine 118 fetches data for the packets to be sent out of system 100 via network interface 114. Data fetch engine 118 fetches the aforementioned data from the memory locations specified by MMIO operations in MMIO queue 104. An MMIO operation specifies a memory location by providing a memory address, a length, and may optionally include one or more other parameters. In one embodiment, data fetch engine 116 is a unit included in a networking adapter.

Apparatus 102 generates an output token that is placed in an entry in a packet send queue 120 (i.e., a queue structure in memory used for the send processing task). An entry 122 in packet send queue 120 includes header information (i.e., Header in entry 122) and data fetched by data fetch engine 118 (i.e., Data in entry 122). Entries in packet send queue 120 are packets sent to a target via network interface 114.

In one embodiment, the packets received via network interface 114 are included in multiple queues for receiving, which includes packet receive queue 110. Furthermore, in the embodiment described in this paragraph, the packets sent to targets via network interface 114 are sent from multiple queues for sending, which includes packet send queue 120. Each of the multiple queues for receiving and each of the multiple queues for sending include multiple entries. For example, an InfiniBand architecture uses Queue Pairs to keep track of multiple queues for receiving and multiple queues for sending.

In an embodiment with multiple queues for receiving and for sending, system 100 includes a linked list of active queues which have work pending (e.g., work to send packets). More than one linked list of active queues may be included in system 100 to manage different traffic classes.

Figure 2:
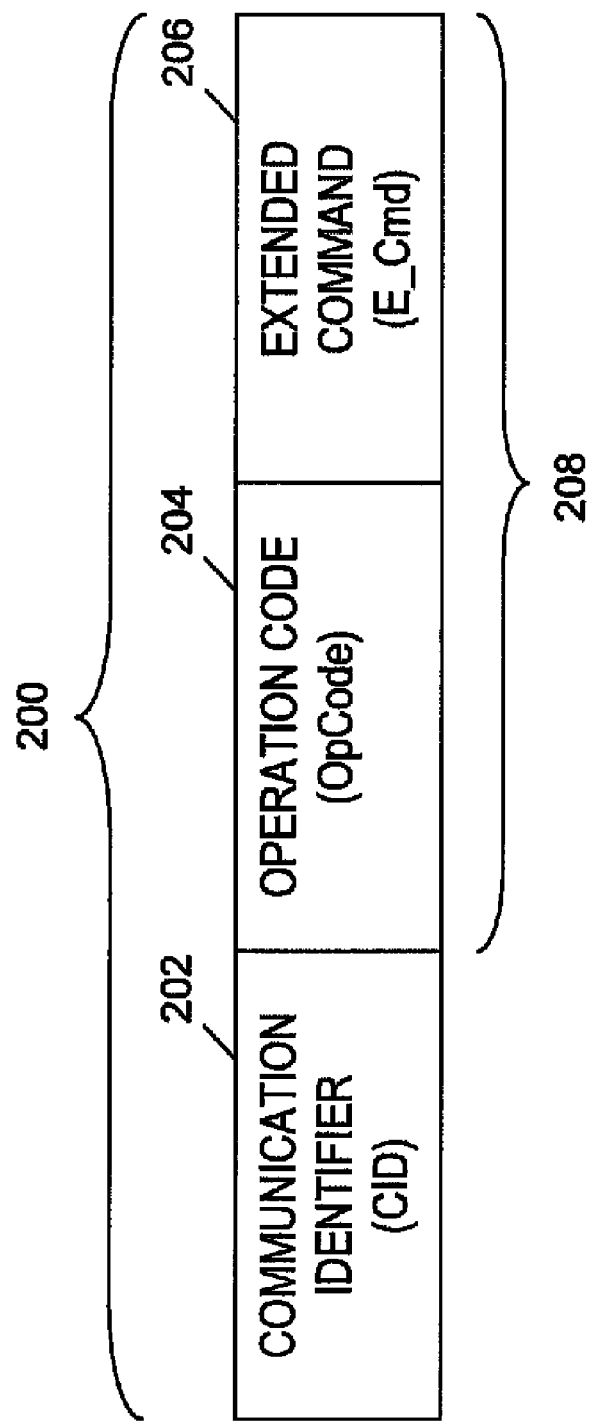
FIG. 2 is a block diagram of a format of an input token received by the apparatus in FIG. 1, in accordance with embodiments of the present invention.

FIG. 2 is a block diagram of a format of an input token received by the apparatus in FIG. 1, in accordance with embodiments of the present invention. An input token 200 includes fields 202, 204 and 206. Field 202 includes a communication identifier (CID), which identifies the EFSM instance to handle an operation specified by the input token 200. For example, the CID in field 202 identifies an EFSM instance to process a packet header token. Field 204 includes an operation code (i.e., OpCode) that identifies a type of the operation specified by the input token 200. Field 206 includes an extended command (i.e., E_Cmd or EC), which is used in the extended state variables of the EFSM instance identified by field 202. In the case in which field 202 identifies an EFSM instance to process a packet header token, field 204 specifies an operation, and additional information such as memory address, length and other values are included in E_Cmd in field 206.

Figure 3:
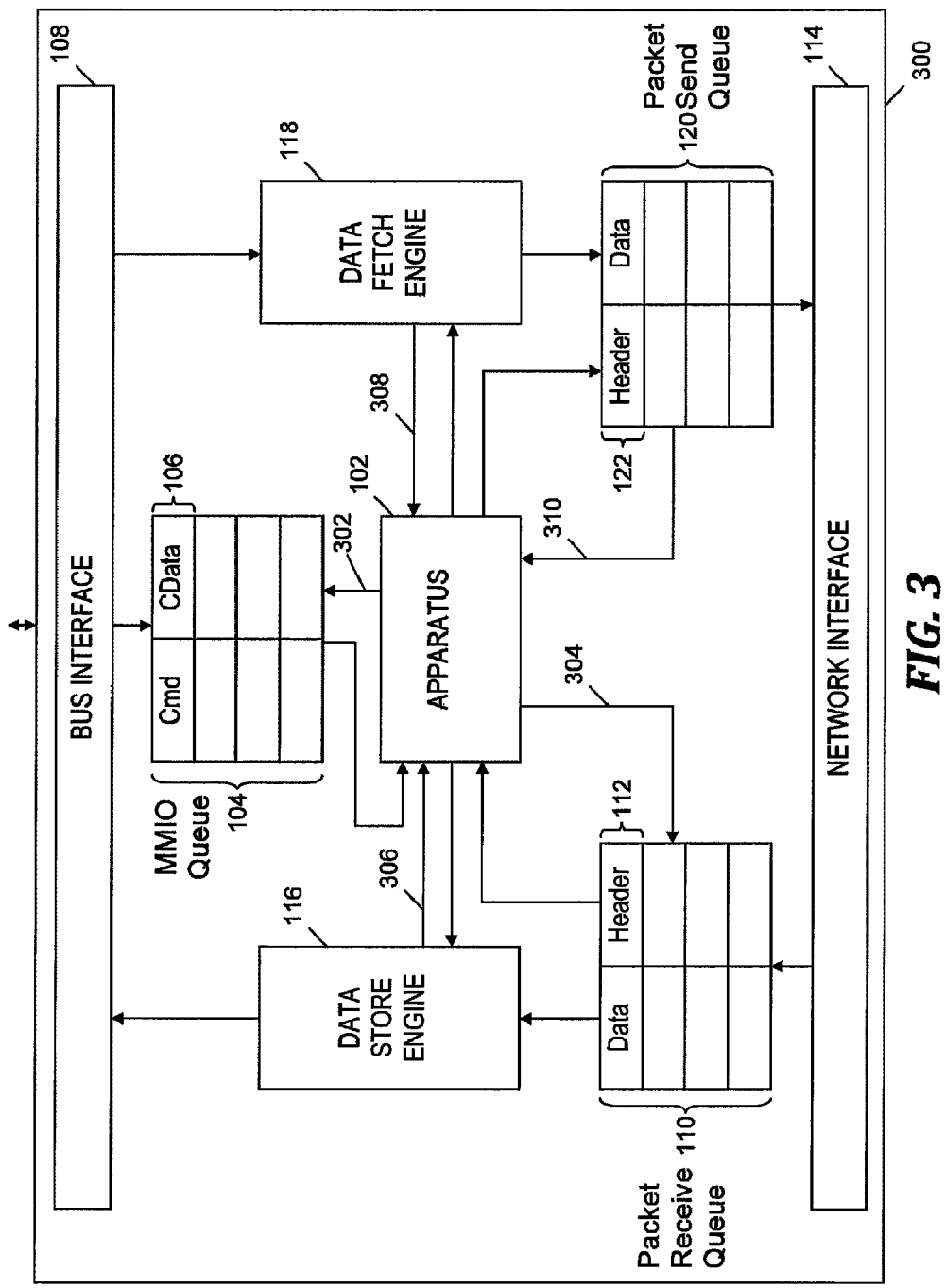
FIG. 3 is a block diagram of the system of FIG. 1 enhanced with resource credits, in accordance with embodiments of the present invention.

FIG. 3 is a block diagram of the system of FIG. 1 enhanced with resource credits, in accordance with embodiments of the present invention. System 300 is an environment that includes an apparatus 102 that implements the pipelined VMI EFSM with a wait room or a wait queue, as disclosed herein. The functionality of apparatus 102, MMIO queue 104, MMIO queue entry 106, bus interface 108, packet receive queue 110, packet receive queue entry 112, network interface 114, data store engine 116, data fetch engine 118, packet send queue 120, and packet send queue entry 122 in system 300 is as described above relative to FIG. 1. In addition, arrows 302 and 304 indicate input first-in-first-out (FIFO) buffer credits and arrows 306, 308 and 310 indicate resource credits.

Figure 4:
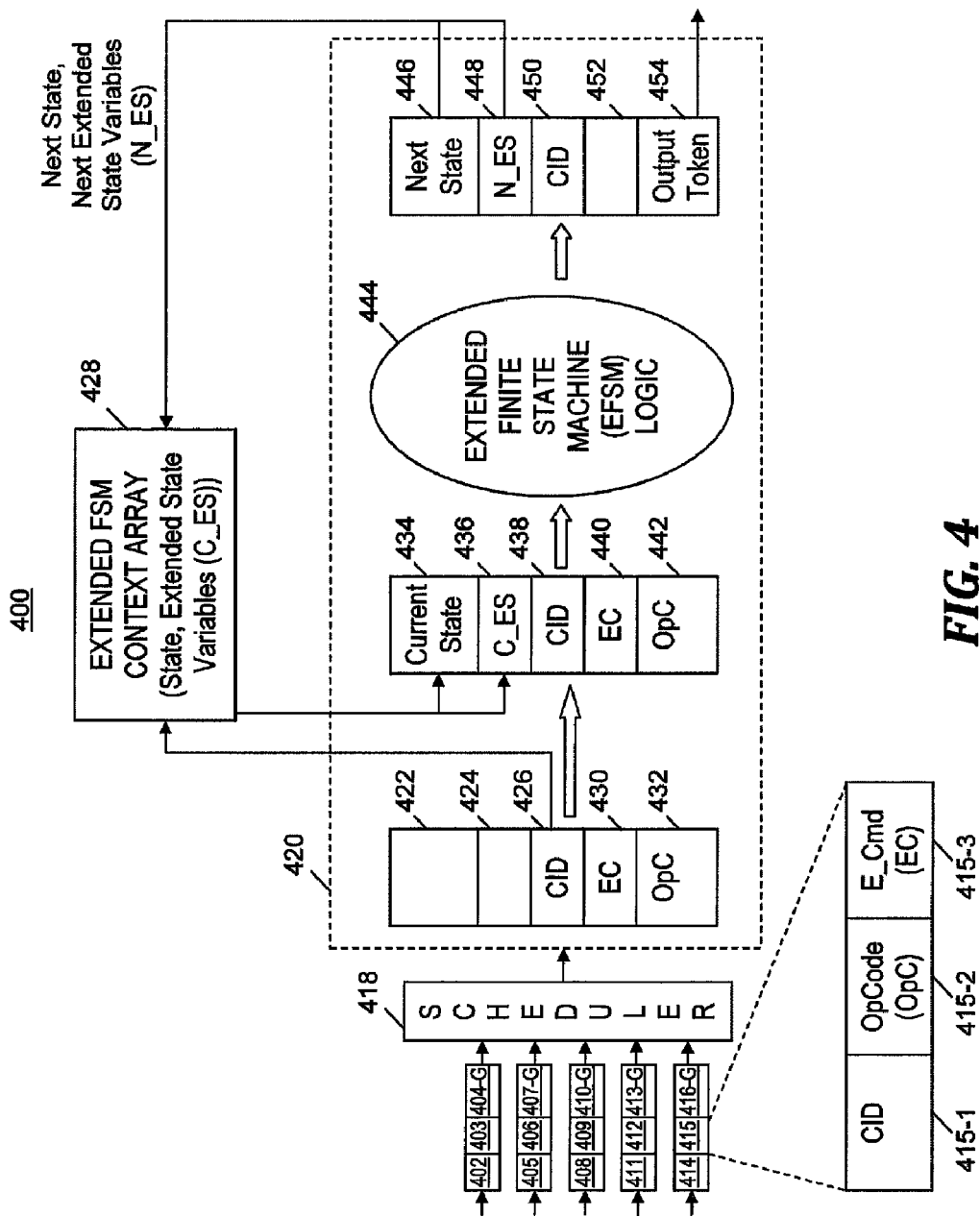
FIG. 4 is a block diagram of a system that includes a pipelined virtual multiple instance extended finite state machine that is implemented in the apparatus of FIG. 1, in accordance with embodiments of the present invention.

FIG. 4 is a block diagram of a system that includes a pipelined virtual multiple instance extended finite state machine that is implemented in the apparatus of FIG. 1, in accordance with embodiments of the present invention. System 400 includes multiple input queues. Although FIG. 4 illustrates five input queues, the present invention contemplates any number comprising multiple input queues. A first input queue includes a plurality of input FIFO buffers (e.g., input FIFO buffers 402 and 403) and an optional guard 404-G. A second input queue includes a plurality of input FIFO buffers (e.g., input FIFO buffers 405 and 406) and an optional guard 407-G. A third input queue includes a plurality of input FIFO buffers (e.g., input FIFO buffers 408 and 409) and an optional guard 410-G. A fourth input queue includes a plurality of input FIFO buffers (e.g., input FIFO buffers 411 and 412) and an optional guard 413-G. A fifth input queue includes a plurality of input FIFO buffers (e.g., input FIFO buffers 414 and 415) and an optional guard 416-G. The multiple input queues are multiplexed by a scheduler 418.

In one embodiment, multiple input tokens enter system 400, where each input token enters the system via an input FIFO buffer (e.g., input FIFO buffer 415) and requests processing. Each input token entering system 400 has a format that includes the fields described above relative to FIG. 2. For example, input FIFO buffer 415 includes an input token that includes fields 415-1, 415-2, 415-3, CID field 415-1 is an example of field 202 (see FIG. 2), OpCode (i.e., OpC) field 415-2 is an example of field 204 (see FIG. 2), and E_Cmd (i.e., EC) field 415-3 is an example of field 206 (see FIG. 2).

Each request for processing by an input token may be filtered by a guard (e.g., guard 416-G), which is a hardware component that solves read/write conflicts related to a VMI EFSM pipeline 420. Only one request per target EFSM instance (or set of EFSM instances) is in pipeline 420 at any given point in time. After multiple input tokens are received via the FIFO buffers and optionally via the guards, the scheduler 418 multiplexes the input data streams that include the input tokens, thereby selecting a single input token to be processed by the pipeline 420.

The input token selected by scheduler 418 includes fields 422 and 424 that include no values when the input token enters pipeline 420. Further, the input token includes a field 426, which includes a CID that identifies a slot (i.e., a part) of an EFSM context array 428, where the slot references a particular EFSM instance of multiple EFSM instances of a VMI EFSM. As used herein, an array such as array 428 is defined as an addressable block of memory. Still further, the input token selected by the scheduler includes a field 430 that includes an extended command (EC) and a field 432 that includes an operation code (OpC).

The value in field 426 is read and used to look up and retrieve a current state and a current set of one or more extended state variables (a.k.a. C_ES) from EFSM context array 428, where the EFSM context array associates the value included in field 426 with the state and extended state variable(s) of the referenced EFSM instance.

The retrieved current state and C_ES are added to the selected input token, thereby generating input token with fields 434, 436, 438, 440 and 442. Field 434 includes the retrieved current state and field 436 includes the C_ES. Field 438 includes the same contents as field 426 (i.e., the CID of the selected input token). Field 440 includes the same contents as field 430 (i.e., the EC of the selected input token). Field 442 includes the same contents as field 432 (i.e., the OpC of the selected input token).

In the next stage of processing the input token, a classical transformation by extended finite state machine (EFSM) logic 444 takes place that uses the current state in field 434, the C_ES in field 436, the extended command in field 440 and the operation code in field 442 to generate a next state (i.e., an update to the current state), a next set of one or more extended state variables (i.e., N_ES, which is an update to the C_ES), and output token data. The processing by logic 444 inserts the next state into field 446, the N_ES into field 448, the CID into field 450, no value into field 452, and the output token data into field 454. The contents of the CID field in 426 travels unchanged through the pipeline 420 to field 450. The next state and N_ES are written to array 428 at a slot referenced by the CID in field 450 so that the updated state and extended state variable(s) are visible to the next token that references the same slot.

Figure 7A:
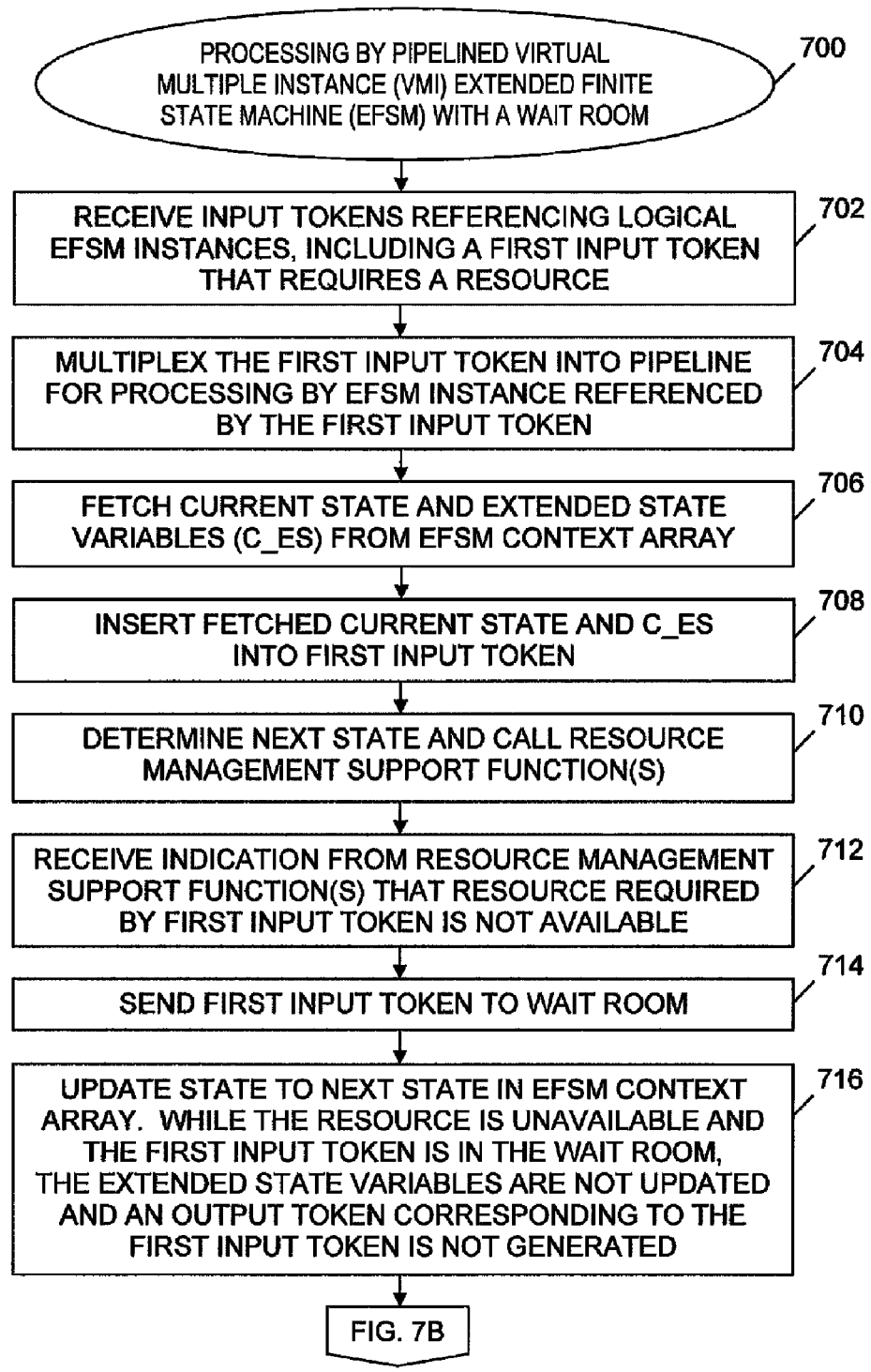
FIGS. 7A-7B depict a flowchart of steps for processing by a pipelined virtual multiple instance extended finite state machine with the wait room included in the system of FIG. 6, in accordance with embodiments of the present invention.
Figure 7B:
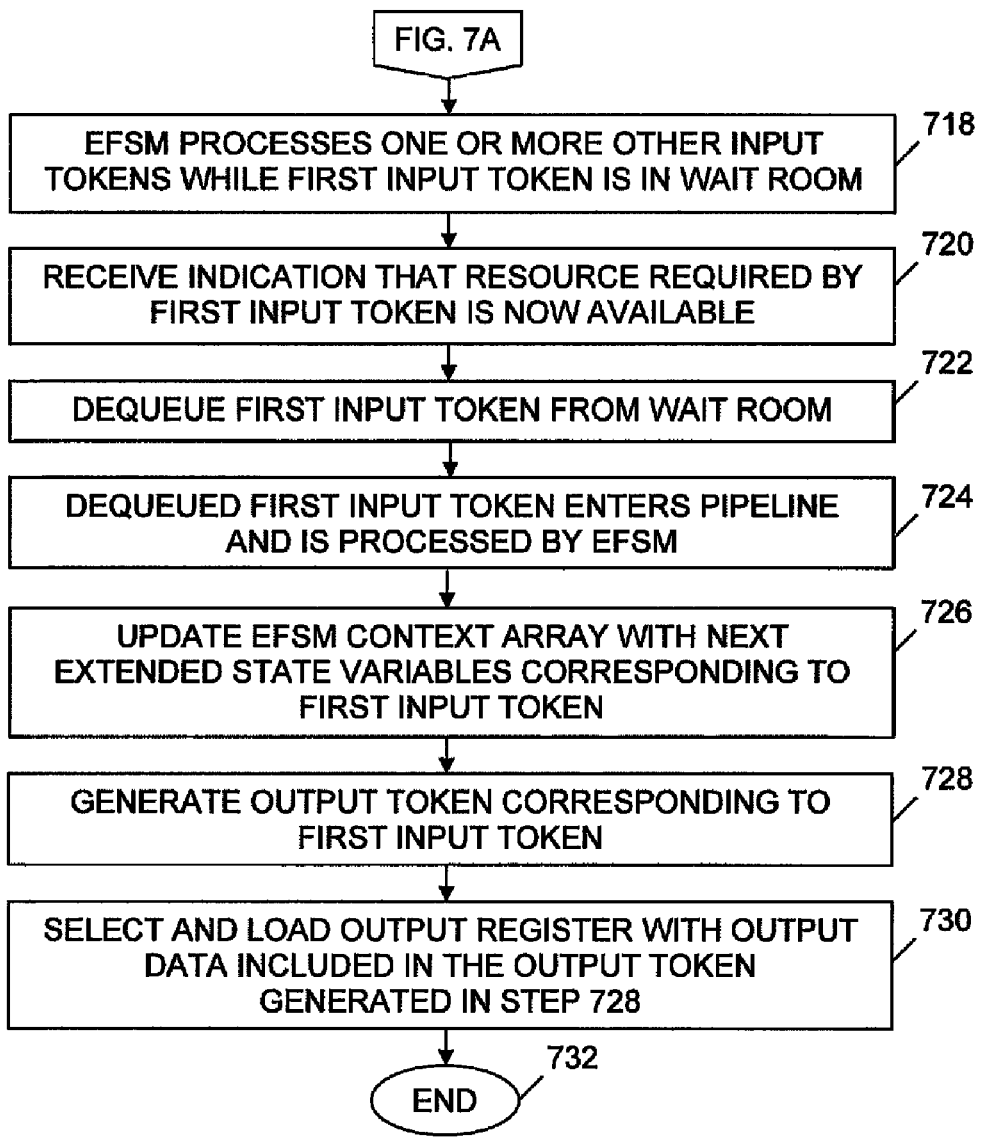
Figure 9A:
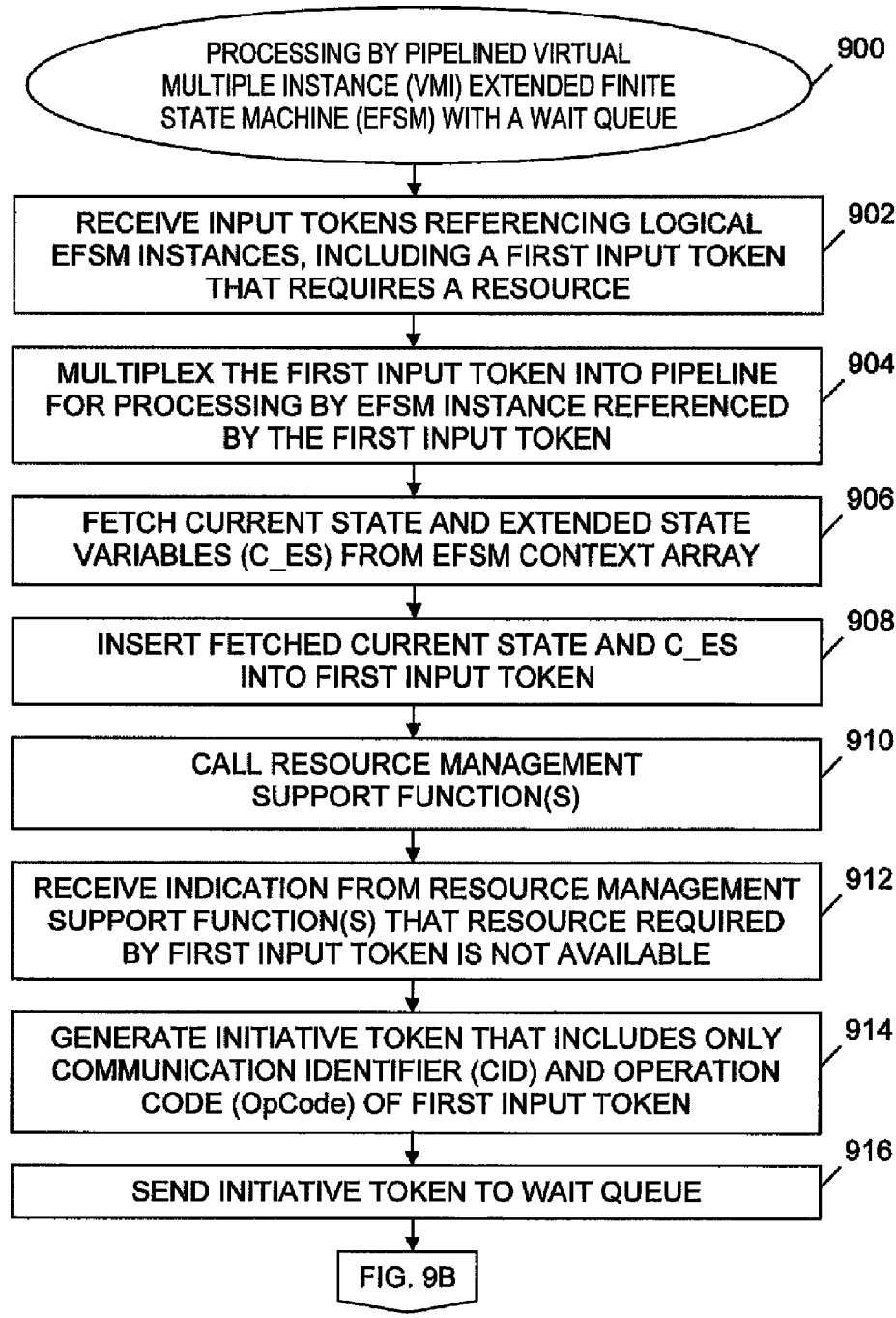
FIGS. 9A-9B depict a flowchart of steps for processing by a pipelined virtual multiple instance extended finite state machine with the wait queue included in the system of FIGS. 8A-8B, in accordance with embodiments of the present invention.
Figure 9B:
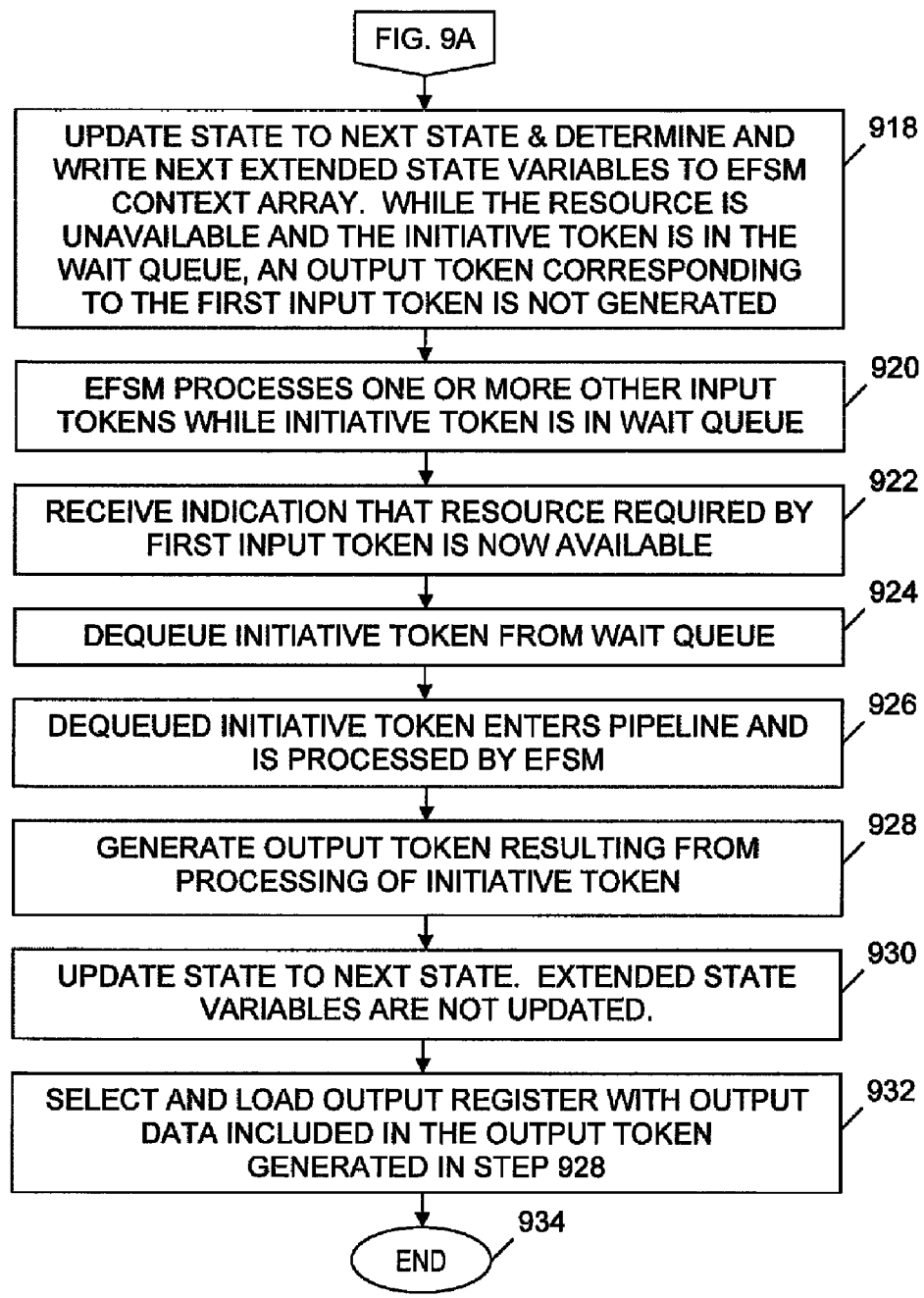

In one embodiment, input FIFO buffers 402, 403, 405, 406, 408, 409, 411, 412, 414, and 415, guards 404-G, 407-G, 410-G, 413-G, and 416-G, scheduler 418 and logic 444 are implemented as logic circuitry (i.e., one or more logic circuits) comprising multiple electrically conductive elements that provide one or more blocks of combinational logic that perform operations included in the process of FIGS. 7A-7B, the process of FIGS. 9A-9B, or a combination thereof. For example, logic 444 is logic circuitry included in a digital I/O chip.

In one embodiment, initiatives (e.g., for initiating I/O events) are received by system 400 via the input tokens. For example, in the case of system 400 being used to implement an InfiniBand adapter, the CID field in the input token is a Queue Pair Number (i.e., QP number), which identifies a primary element of the Infiniband architecture. In the Infini-Band architecture, communication occurs between queue pairs, instead of between ports. A queue pair in the Infiniband architecture is an addressable entity that consists of two work queues: a Send work queue and a Receive work queue.

Figure 5:
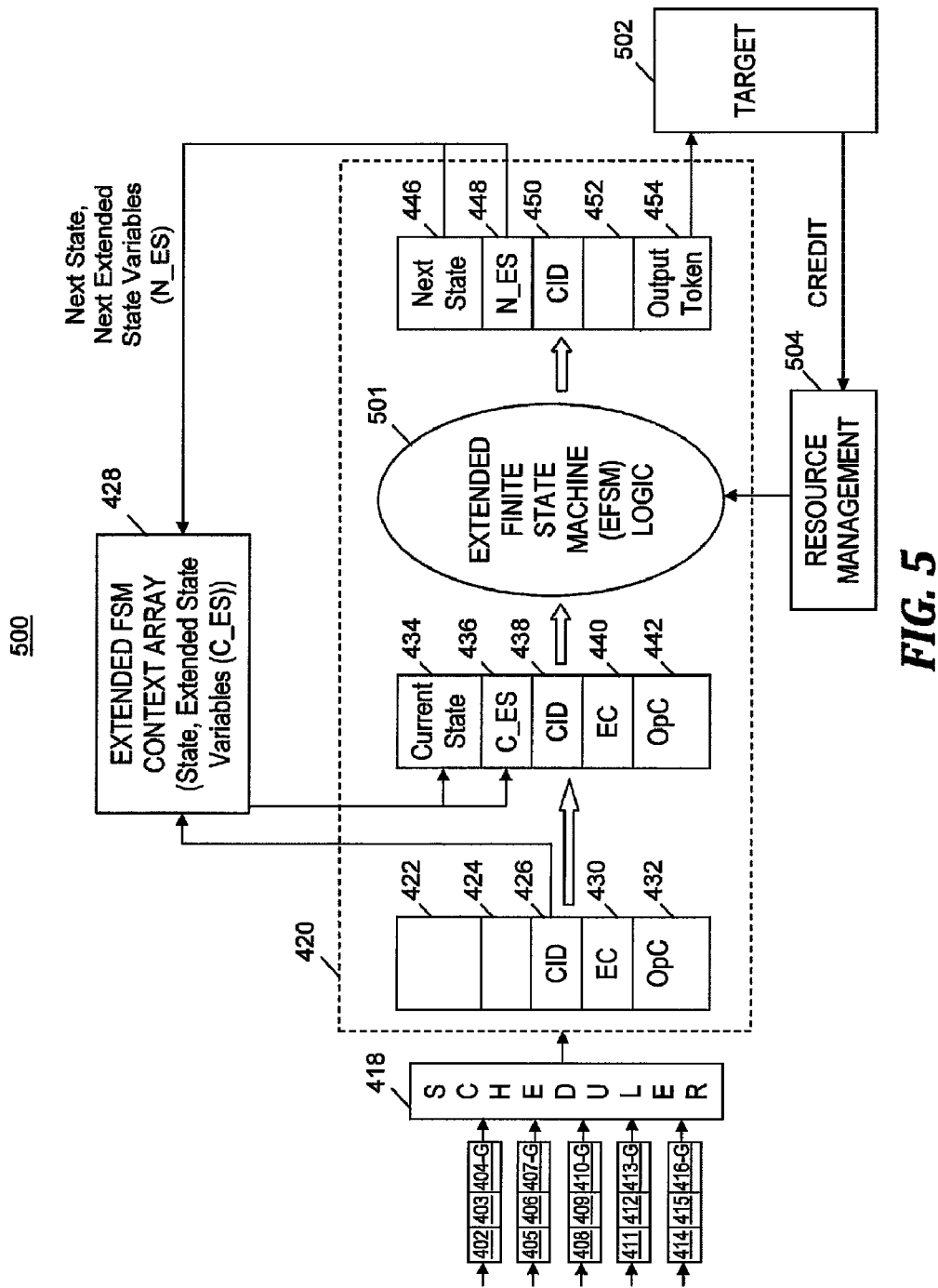
FIG. 5 is a block diagram of the system of FIG. 4 enhanced with resource credits, in accordance with embodiments of the present invention.

FIG. 5 is a block diagram of the system of FIG. 4 enhanced with resource credits, in accordance with embodiments of the present invention. System 500 includes the components of system 400 (see FIG. 4), which are described above relative to FIG. 4, with the exception that logic 444 (see FIG. 4) is replaced by extended finite state machine logic 501. System 500 also includes a target 502 of output token data 454. In response to the target 502 completing its use of the resource required by output token data 454, a credit indication is sent to a resource management component 504 (i.e., one or more support functions that manage resources required by input tokens) to indicate that the resource has become available. After receiving the credit indication, the resource management component 504 notifies logic 501 of the availability of the resource.

Wait Room

Figure 6:
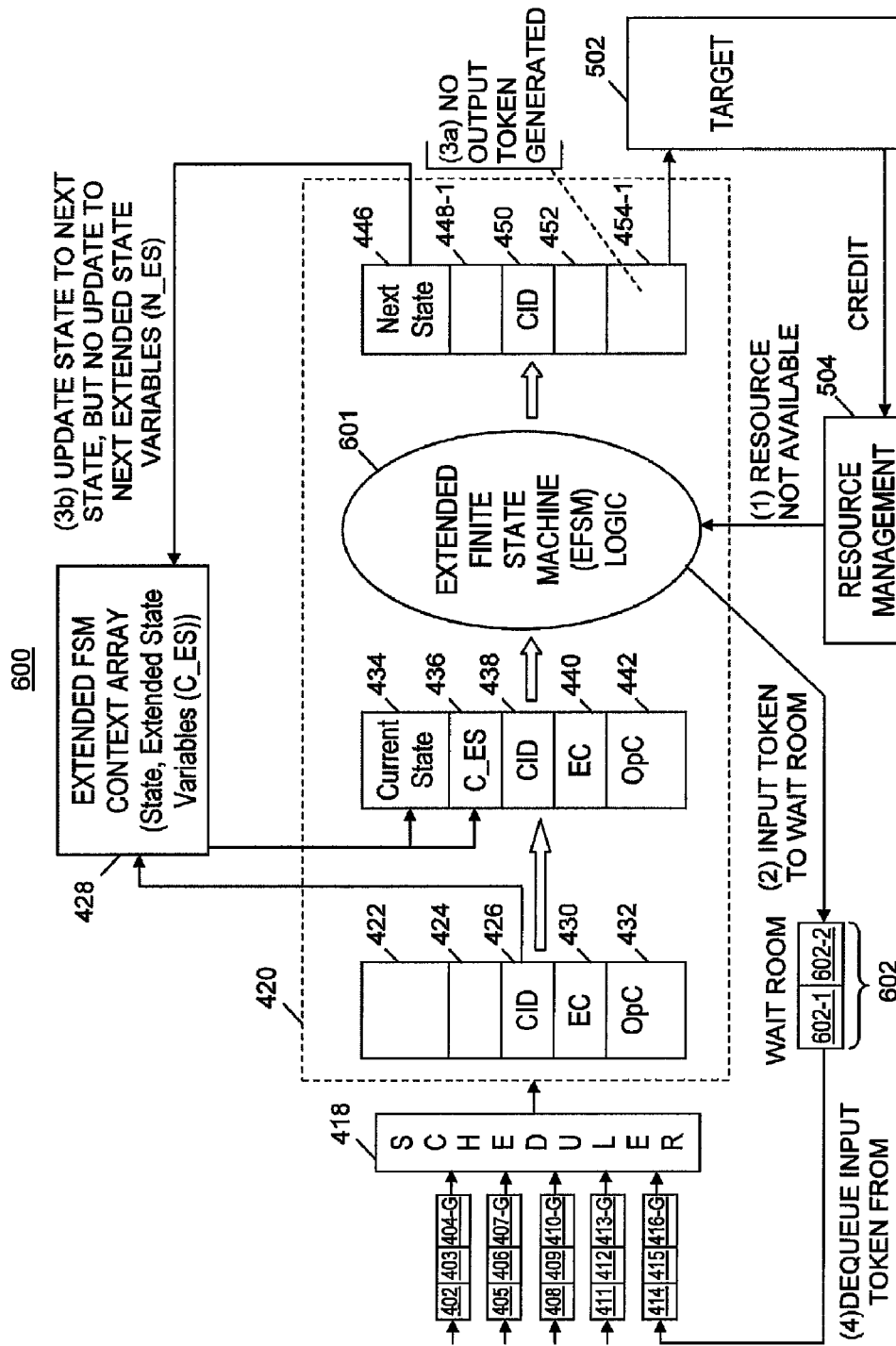
FIG. 6 is a block diagram of the system of FIG. 5 enhanced with a wait room, in accordance with embodiments of the present invention.

FIG. 6 is a block diagram of the system of FIG. 5 enhanced with a wait room, in accordance with embodiments of the present invention. System 600 includes the components of system 400 (see FIG. 4) and system 500 (see FIG. 5), with the exception that extended finite state machine logic 601 replaces logic 444 (see FIG. 4) and logic 501 (see FIG. 5), field 448 that includes N_ES in FIG. 4 and FIG. 5 is an empty field 448-1 in FIG. 6, and field 454 that includes output token data 454 in FIG. 4 and FIG. 5 is an empty field 454-1 in FIG. 6. The components shared by system 600 and system 400 (see FIG. 4) and system 500 (see FIG. 5) are described above relative to FIG. 4 and FIG. 5. System 600 also includes a wait room 602 that includes one or more entries comprising queued input tokens (i.e., queued packet headers) (e.g., entries 602-1 and 602-2). Each entry in wait room 602 is a complete input token. Although FIG. 6 illustrates two entries in wait room 602, the present invention contemplates one or more entries in wait room 602 up to a predefined capacity limit.

In system 600, an input token enters pipeline 420. The input token requires that a resource be available. Logic 601 receives from resource management component 504 an indication that the required resource is unavailable. The logic 601 places the input token in wait room 602 as entry 602-2. While the input token is in wait room 602, logic 601 does not generate output token data and therefore, field 454-1 remains empty. Furthermore, while the input token is in wait room 602 and the required resource is unavailable, the next state is determined by logic 601, but logic 601 does not update the extended state variable(s). Thus, array 428 does not receive an update of the extended state variable(s) while the input token is in wait room 602 and while the required resource is unavailable. While the input token is in wait room 602 and while the resource remains unavailable, one or more other input tokens are processed in pipeline 420 without requiring that, prior to the processing of the one or more other input tokens, the pipeline be (1) stalled in response to determining the required resource is unavailable and (2) restarted subsequent to the stalling of the pipeline and subsequent to determining that the previously unavailable required resource becomes available. When the target 502 signals to resource management 504 that credits are available, this information (i.e., that credits are available) is forwarded by the resource management 504 to the wait room 602. The target 502 signaling that credits are available indicates that the status of availability of the required resource has changed from being unavailable to being available. If there are one or more input tokens queued in wait room 602 at the time wait room 602 receives from resource management 504 the information about credits being available, then logic of wait room 602 dequeues the next input token of the aforementioned queued input token(s) and sends the dequeued input token to the input FIFO 414. The actions involving processing an input token in system 600 are further described below relative to the flowchart in FIGS. 7A-7B.

In a case in which wait room 602 is at its predefined capacity limit and cannot receive another input token, system 600 stalls pipeline 420 in response to determining that an input token in the pipeline requires a resource that is unavailable. The pipeline 420 remains stalled until one or more input tokens dequeued from wait room 602 enter one or more input queues and arrive at pipeline 420.

FIGS. 7A-7B depict a flowchart of steps for processing by a pipelined virtual multiple instance extended finite state machine with the wait room included in the system of FIG. 6, in accordance with embodiments of the present invention. The steps for processing by logic 601 (see FIG. 6) begin at step 700 of FIG. 7A. In step 702, scheduler 418 (see FIG. 6) receives multiple input tokens via multiple input FIFO buffers (e.g., input FIFO 402, 403, 405, and 406 in FIG. 6) and via optional multiple guards (e.g., guard 404-G and 407-G in FIG. 6). The multiple input tokens received in step 702 reference multiple logic EFSM instances of the VMI EFSM implemented by logic 601 (see FIG. 6). The multiple input tokens received in step 702 include an input token that requires a resource.

In step 704, scheduler 418 (see FIG. 6) multiplexes the multiple input tokens and, as a result of the multiplexing, selects the aforementioned input token (i.e., the input token that requires the resource) for processing by an EFSM instance of the multiple EFSM instances. The EFSM instance is referenced by the input token selected in step 704 (i.e., referenced by the contents of a communication identifier field of the selected input token; e.g., referenced by CID field 415-1 in FIG. 4). Hereinafter in the discussion of FIGS. 7A-7B, the input token selected in step 704 is referred to as the first input token.

In step 706, logic of pipeline 420 (see FIG. 6) fetches the current state and one or more extended state variables (i.e., C_ES) of the aforementioned EFSM instance referenced by the first input token. The state and C_ES are fetched from array 428 (see FIG. 6) in step 706. Although not shown in FIGS. 7A-7B, one or more other input tokens arrive in pipeline 420 (see FIG. 6) for processing by logic 601 (see FIG. 6) in parallel with subsequent steps of FIGS. 7A-7B described below.

In step 708, logic of pipeline 420 (see FIG. 6) inserts the fetched current state and the fetched C_ES into the first input token. Following step 708 and prior to step 710, logic of pipeline 420 (see FIG. 6) switches to the aforementioned FSM instance referenced by the first input token by receiving the first input token including the fetched state and fetched C_ES.

In step 710, logic 601 (see FIG. 6) determines the next state (i.e., an update of the fetched current state) and calls one or more resource management support functions 504 (see FIG. 6). In step 712, logic 601 (see FIG. 6) receives an indication from the resource management support function(s) 504 (see FIG. 6) that the resource required by the first input token is unavailable.

In step 714, in response to receiving the indication that the resource is unavailable in step 712, logic 601 (see FIG. 6) sends the first input token to wait room 602 (see FIG. 6). In step 716, logic 601 (see FIG. 6) updates the state in array 428 (see FIG. 6) to the next state determined in step 710. While the resource is unavailable and the first input token is in wait room 602 (see FIG. 6), C_ES are not updated and an output token corresponding to the first input token (i.e., the output token resulting from processing the first input token by logic 601 in FIG. 6) is not generated. Step 716 is followed by step 718 in FIG. 7B.

In step 718 of FIG. 7B, logic of pipeline 420 (see FIG. 6) processes one or more other input tokens while the first input token is in wait room 602 (see FIG. 6). That is, the one or more other input tokens are processed by the one or more EFSM instances referenced by the one or more other input tokens while the resource required by the first input token is unavailable. The processing of the one or more other input tokens in step 718 is performed without requiring that, prior to step 718, pipeline 420 (see FIG. 6) be (1) stalled in response to determining that the resource is unavailable and (2) restarted subsequent to the stall and subsequent to determining that the previously unavailable resource becomes available.

Subsequent to step 718 and prior to step 720, the resource required by the first input token becomes available and target 502 (see FIG. 6) signals to resource management support function(s) 504 (see FIG. 6) that credits are available (i.e., indicating that the resource required by the first input token has become available). In step 720, logic of wait room 602 (see FIG. 6) receives an indication from resource management support function(s) 504 (see FIG. 6) that the resource required by the first input token is now available after having been unavailable. In step 722, in response to receiving the indication that the resource is available in step 720, logic of wait room 602 (see FIG. 6) dequeues the first input token from wait room 602 (see FIG. 6).

In step 724, the dequeued first input token enters pipeline 420 (see FIG. 6) via input FIFO 414 (see FIG. 6) and is processed by logic of pipeline 420 (see FIG. 6). In step 726, logic 601 (see FIG. 6) updates array 428 (see FIG. 6) with a next set of one or more extended state variables (a.k.a. N_ES), which is an update of the C_ES. In step 728, logic 601 (see FIG. 6) generates an output token corresponding to the first input token. That is, logic 601 (see FIG. 6) generates output token data based on the state and extended state variables fetched from array 428 (see FIG. 6), the contents of the EC and OpC fields (e.g., fields 415-2 and 415-3 in FIG. 4), and the indication received in step 720 that the required resource is available. In step 730, logic 601 (see FIG. 6) selects an output register and loads the selected output register with the output token data included in the output token generated in step 728. Logic 601 (see FIG. 6) sends the output token data to target 502 (see FIG. 6). The process of FIGS. 7A-7B ends at step 732.

Figure 7C:
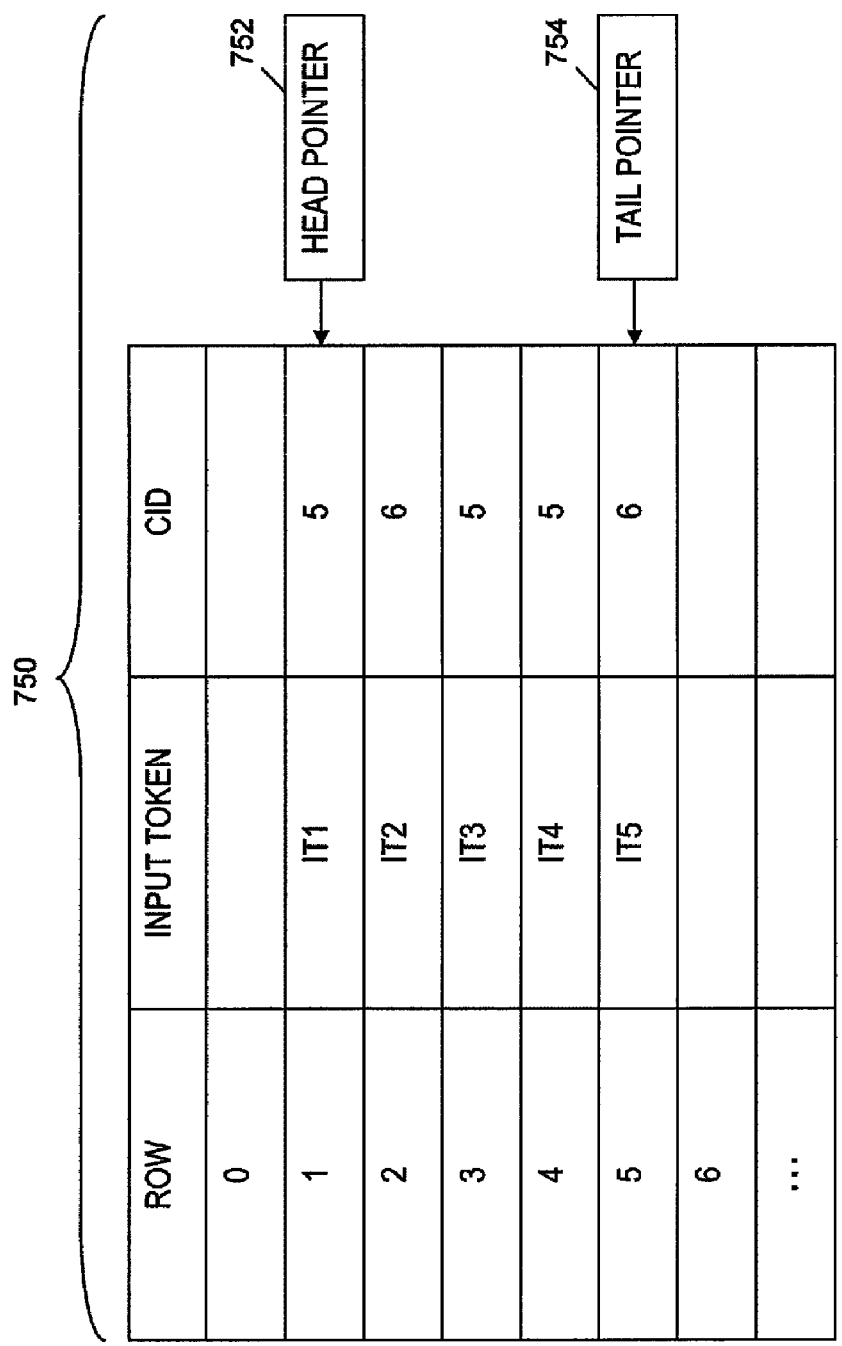
FIG. 7C depicts an example of a wait room included in the system of FIG. 6, in accordance with embodiments of the present invention.

FIG. 7C depicts an example of a wait room included in the system of FIG. 6, in accordance with embodiments of the present invention. A wait room array 750 (a.k.a. wait room 750) is an example of wait room 602 (see FIG. 6) and includes entries in rows 1 through 5. Each entry in wait room 750 includes an input token and a CID. For example, the entry in row 1 includes an input token IT1 and a CID whose value is 5. Wait room 750 is populated with entries in rows 1 through 5 by step 714 (see FIG. 7A) and steps analogous to steps 704 through 716 that are performed for other input tokens (e.g., a second input token, a third input token, etc.) processed in step 718 (see FIG. 7B). A head pointer 752 points to the entry in wait room 750 that is designated as the next entry to be dequeued in step 722 (see FIG. 7B) if a resource becomes available. A tail pointer 754 points to the last valid entry in wait room 750. The size of wait room 750 is typically smaller than the size of the context array 428 (see FIG. 6).

There may be multiple entries in a wait room that have the same CID value and different input tokens. As one example, rows 1, 3 and 4 of wait room 750 include the same CID value of 5, but include the different input tokens IT1, IT3 and IT5, respectively. As another example, rows 2 and 5 in wait room 750 include the same CID value of 6, but include different input tokens IT2 and IT6, respectively.

Wait Queue

Figure 8A:
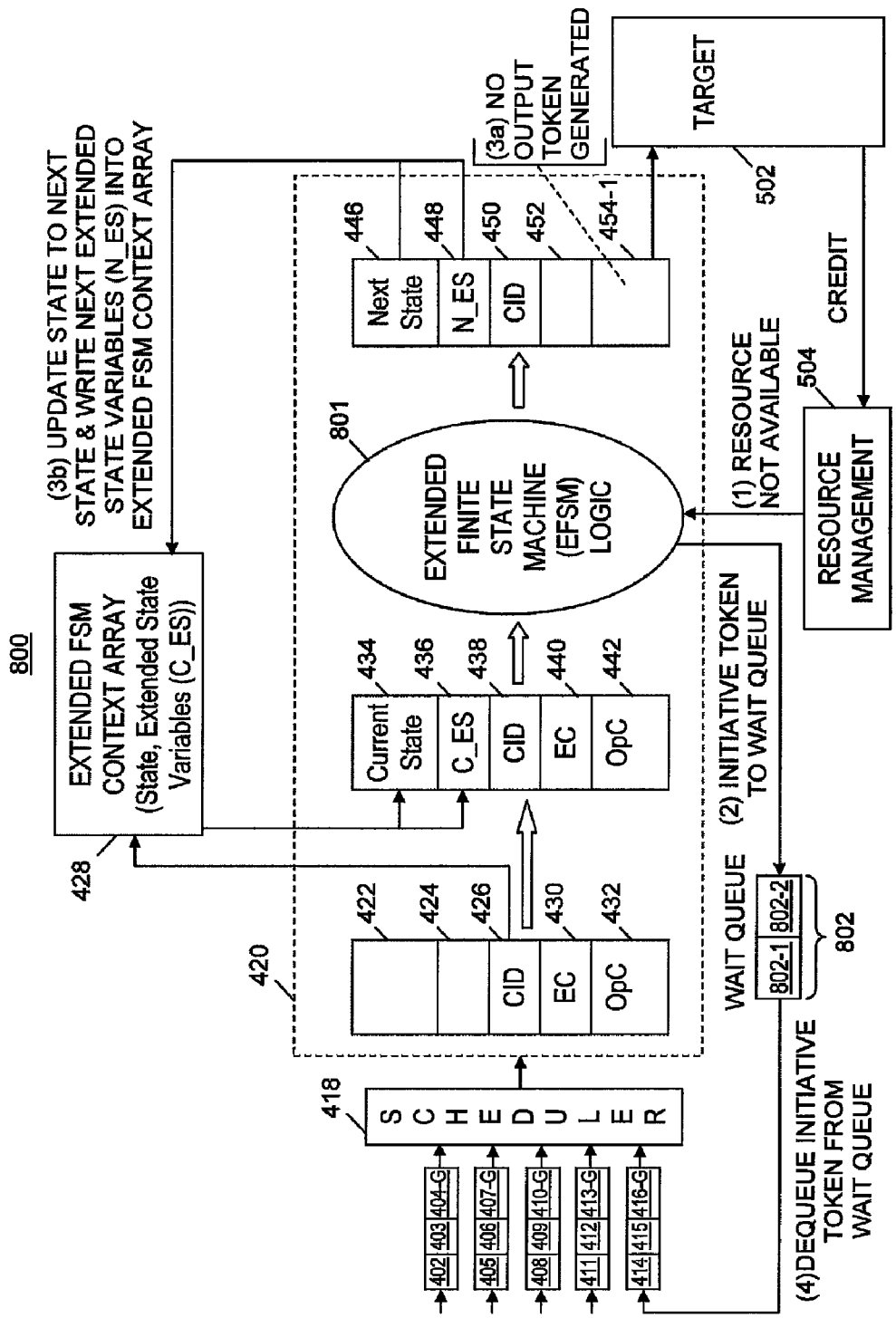
FIGS. 8A-8B is a block diagram of the system of FIG. 5 enhanced with a wait queue, in accordance with embodiments of the present invention.
Figure 8B:
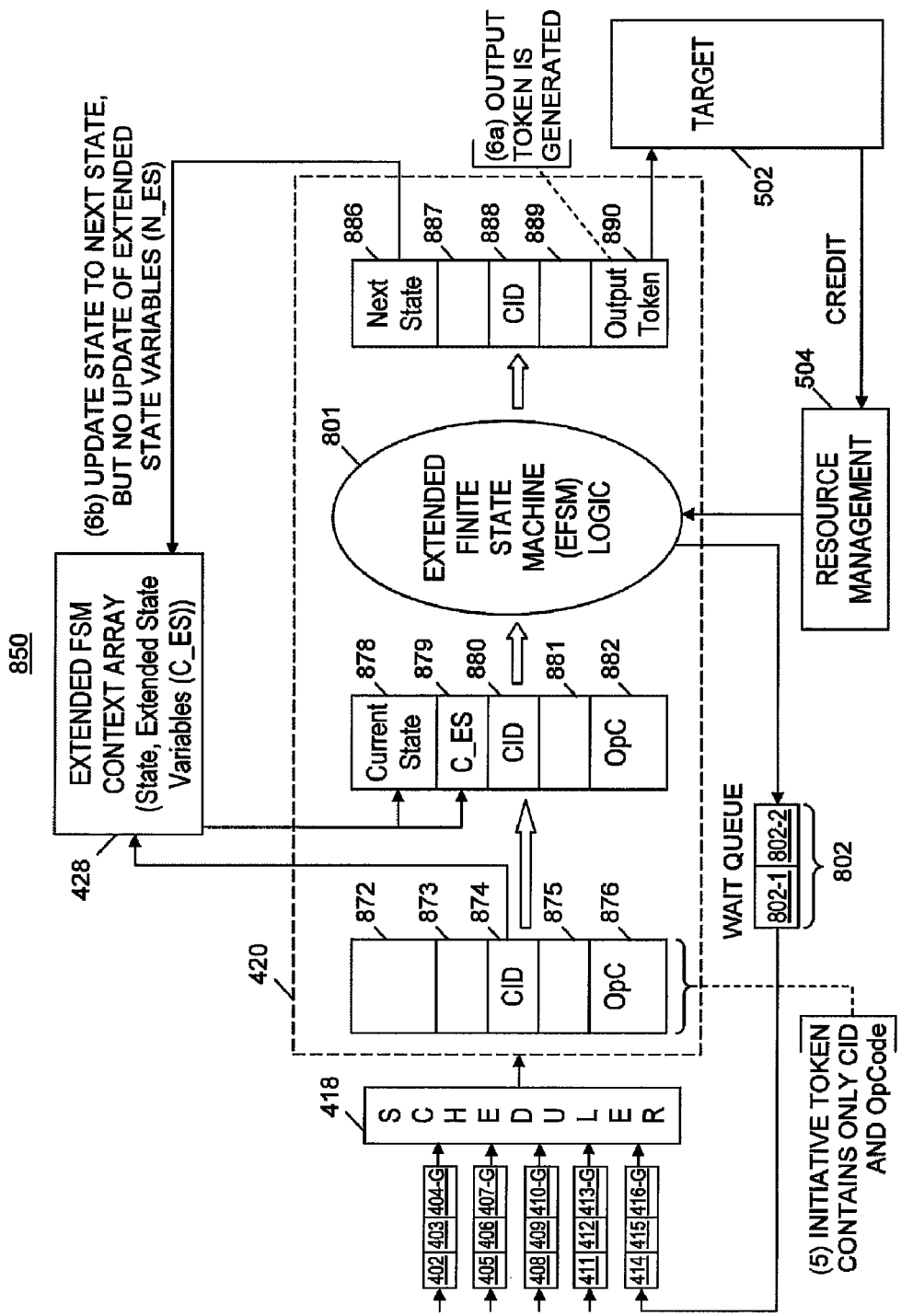

FIGS. 8A-8B is a block diagram of the system of FIG. 5 enhanced with a wait queue, in accordance with embodiments of the present invention. System 800 includes the components of system 400 (see FIG. 4) and system 500 (see FIG. 5), except that extended finite state machine logic 801 replaces logic 444 (see FIG. 4) and logic 501 (see FIG. 5) and field 454 that includes output token data 454 in FIG. 4 and FIG. 5 is an empty field 454-1 in FIG. 8A. The components shared by system 800 and system 400 (see FIG. 4) and system 500 (see FIG. 5) are described above relative to FIG. 4 and FIG. 5. System 800 also includes a wait queue 802. In another embodiment, system 800 includes wait queue 802 and one or more other wait queues (not shown). Each wait queue is a linked list of one or more CIDs (e.g., included in entries 802-1 and 802-2) that are associated with one or more input tokens that are waiting for one or more unavailable resources required by the input token(s) to become available. In the embodiment in which system 800 includes multiple wait queues, the multiple wait queues are associated with multiple required resources in a one-to-one correspondence.

In one embodiment, a CID needs more than one resource to execute an operation, but if the CID cannot execute the operation because multiple resources are unavailable, then the CID is stored in and waits in exactly one linked list that implements a wait queue. The linked list that the CID waits in is the linked list that implements a wait queue associated with a first resource of the multiple unavailable required resources. After the first resource becomes available, and a second resource of the multiple required resources is still unavailable, then the CID waits in a second wait queue associated with the second resource.

For example, if CID 5 (i.e., a CID having a value of 5) requires resources R1, R2 and R3, and none of R1, R2 and R3 are available, then CID 5 waits in Wait Queue 1 until the resource R1 becomes available. For the example in this paragraph, Wait Queue 1 is a first linked list associated with R1, Wait Queue 2 is a second linked list associated with R2, and Wait Queue 3 is a third linked list associated with R3. When R1 becomes available in the example in this paragraph, R2 is also available, but R3 is unavailable. In response to detecting that R1 has become available, CID 5 grasps the resources R1 and R2 and is then enqueued in Wait Queue 3. CID 5 waits in Wait Queue 3 until resource R3 becomes available.

After implementing one linked list as a wait queue, implementing additional linked list is cheap. The elements of a linked list implementation of each wait queue are:
A head and a tail pointer for the wait queue
An array in which the linked list is built
Each entry of the array contains:
 i. The pointer to the next element in the array (e.g., 8 bits for an array of 256 entries); and
 ii. An indication to which wait queue the array entry belongs. In one embodiment, the indication employs one-hot encoding and N bits are needed to represent N wait queues associated with N resources. In another embodiment, the indication is the ordinal number of the wait queue encoded as a binary number, which would require fewer bits than the one-hot encoding.

A wait queue can be implemented if an extended command portion of an input token can be processed by the VMI EFSM even if the resource required by the input token is unavailable. Although FIG. 8A illustrates two entries in wait queue 802, the present invention contemplates one or more entries in wait queue 802 up to a predefined capacity limit.

In system 800, an input token enters pipeline 420. The input token requires that a resource be available. Logic 801 receives from resource management component 504 an indication that the required resource is unavailable. The logic 801 places an initiative token in wait queue 802 as entry 802-2. The initiative token consists of the communication identifier field and the operation code field of the input token. While the initiative token is in wait queue 802, logic 801 does not generate output token data and therefore, field 454-1 remains empty. Furthermore, while the initiative token is in wait queue 802 and the required resource is unavailable, the next state and next extended state variable(s) (i.e., N_ES) are determined by logic 801 as updates to the current state and extended state variable(s) fetched from array 428, and logic 801 writes the next state and N_ES to array 428. While the initiative token is in wait queue 802 and while the resource remains unavailable, one or more other input tokens are processed in pipeline 420 without a need for the pipeline to be stalled and restarted prior to the processing of the one or more other input tokens. In response to the status of availability of the required resource changing from being unavailable to being available, the target 502 signals to resource management 504 that credits are available and this information (i.e., that credits are available and the required resource is available) is forwarded by resource management 504 to wait queue 802. If there are one or more initiative tokens queued in a linked list of wait queue 802, where the linked list corresponds to the required resource, then logic of wait queue 802 dequeues the next initiative token of the aforementioned queued initiative token(s) and sends the dequeued initiative token to input FIFO 414.

System 850 in FIG. 8B is the system 800 at a time subsequent to the initiative token entering an input queue of pipeline 420 via input FIFO 414. System 850 includes the components of system 400 (see FIG. 4), system 500 (see FIG. 5), and system 800 (see FIG. 8A), except that the token shown at different stages in pipeline 420 is a result of receiving and processing the initiative token, not the first input token of FIG. 8A. The components shared by system 850 and system 400 (see FIG. 4), system 500 (see FIG. 5), and system 800 (see FIG. 8A) are described above relative to FIG. 4, FIG. 5 and FIG. 8A, respectively.

The token that includes fields 872, 873, 874, 875 and 876 is the initiative token that was dequeued from wait queue 802 in FIG. 8A. Upon entry into pipeline 420, the initiative token contains only the CID in field 874 and the operation code in field 876; the other fields (i.e., fields 872, 873, and 875) including the field for the extended command are empty. The current state and extended state variable(s) (C_ES) associated with the CID in field 874 are fetched from array 428 and inserted into the initiative token. After the insertion of the CID and operation code, the token in the pipeline 420 includes fields 878, 879, 880, 881 and 882. Field 878 includes the fetched current state, field 879 includes the fetched extended state variable(s), field 880 includes the CID, field 881 is empty, and field 882 includes the operation code. The output token resulting from logic 801 processing the initiative token includes fields 886, 887, 888, 889 and 890. Logic 801 generates output token data and stores the output token data in field 890. The fetched current state is updated to a next state, which is stored in field 886 and written to array 428. The fetched extended state variable(s) are not updated and are not written to array 428. Fields 887 and 889 are empty. Logic 801 sends the output token data in field 890 to target 502. The actions involving processing an input token and initiative token in system 800 (see FIG. 8A) and system 850 are further described below relative to the flowchart in FIGS. 9A-9B.

FIGS. 9A-9B depict a flowchart of steps for processing by a pipelined virtual multiple instance extended finite state machine with the wait queue included in the system of FIGS. 8A-8B, in accordance with embodiments of the present invention. The steps for processing by logic 801 (see FIGS. 8A-8B) begin at step 900 of FIG. 9A. In step 902, scheduler 418 (see FIGS. 8A-8B) receives multiple input tokens via multiple input FIFO buffers (e.g., input FIFO 402, 403, 405, and 406 in FIGS. 8A-8B) and via optional multiple guards (e.g., guard 404-G and 407-G in FIGS. 8A-8B). The multiple input tokens received in step 902 reference multiple logic EFSM instances of the VMI EFSM implemented by logic 801 (see FIGS. 8A-8B). The multiple input tokens received in step 902 include an input token that requires a resource.

In step 904, scheduler 418 (see FIGS. 8A-8B) multiplexes the multiple input tokens and, as a result of the multiplexing, selects the aforementioned input token (i.e., the input token that requires the resource) for processing by an EFSM instance of the multiple EFSM instances. The EFSM instance is referenced by the input token selected in step 904 (i.e., referenced by the contents of a communication identifier field of the selected input token; e.g., referenced by CID field 415-1 in FIG. 4). Hereinafter, in the discussion of the FIGS. 9A-9B, the input token selected in step 904 is referred to as the first input token.

In step 906, logic of pipeline 420 (see FIGS. 8A-8B) fetches the current state and one or more extended state variables (i.e., C_ES) of the aforementioned EFSM instance referenced by the first input token. The state and C_ES are fetched from array 428 (see FIGS. 8A-8B) in step 906. Although not shown in FIGS. 8A-8B, one or more other input tokens may arrive in pipeline 420 (see FIG. 6) for processing by logic 801 (see FIGS. 8A-8B) in parallel with subsequent steps of FIGS. 8A-8B described below.

In step 908, logic of pipeline 420 (see FIGS. 8A8B) inserts the fetched current state and the fetched C_ES into the first input token. Following step 908 and prior to step 910, logic of pipeline 420 (see FIGS. 8A-8B) switches to the aforementioned FSM instance referenced by the first input token by receiving the first input token including the fetched state and fetched C_ES.

In step 910, logic 801 (see FIGS. 8A-8B) calls one or more resource management support functions 504 (see FIGS. 8A-8B). In step 912, logic 801 (see FIGS. 8A-8B) receives an indication from the resource management support function(s) 504 (see FIGS. 8A-8B) that the resource required by the first input token is unavailable.

Prior to step 914, logic 801 (see FIGS. 8A-8B) determines that the extended command included in the first input token (i.e., the contents of EC field 430 and 440 in FIG. 8A) can be processed even if the resource required by the first input token is unavailable. That is, a processing of the extended command included in the first input token does not require that the resource required by the first input token is available.

In step 914, in response to receiving the indication that the resource is unavailable in step 912, logic 801 (see FIGS. 8A-8B) generates an initiative token that includes only the communication identifier (CID) and the operation code (OpCode) of the first input token. In step 916, logic 801 (see FIGS. 8A-8B) sends the initiative token to wait queue 802 (see FIGS. 8A-8B). Step 916 is followed by step 918 in FIG. 9B.

In step 918 of FIG. 9B, logic 801 (see FIGS. 8A-8B) updates the state in array 428 (see FIGS. 8A-8B) to the next state and writes the next state to array 428 (see FIGS. 8A-8B). Also in step 918, logic 801 (see FIGS. 8A-8B) updates the extended state variable(s) fetched in step 906 (see FIG. 9A) to a next set of one or more extended state variables (i.e., N_ES) and writes the N_ES to array 428 (see FIGS. 8A-8B). Furthermore, step 918 includes logic 801 (see FIGS. 8A-8B) writing the E_Cmd included in the first input token to array 428 (see FIGS. 8A-8B). In one embodiment, if the CID in the first input token has a value of N, then step 918 writes the E_Cmd of the first input token to the N-th entry of array 428 (see FIGS. 8A-8B). While the resource is unavailable and the initiative token is in wait queue 802 (see FIGS. 8A-8B), an output token corresponding to the first input token (i.e., the output token that would have resulted from processing the first input token by logic 801 in FIG. 8A if the resource had been available) is not generated.

In step 920, system 800 (see FIG. 8A) processes one or more other input tokens while the initiative token is in wait queue 802 (see FIGS. 8A-8B). The processing of the one or more other input tokens in step 920 is performed without requiring that pipeline 420 (see FIGS. 8A-8B) be stalled and restarted prior to step 920.

While the resource required by the first input token is unavailable, a second input token included in the one or more other input tokens processed in step 920 may (1) be processed by an EFSM instance referenced by the second input token and result in a corresponding output token being generated, or (2) may require a second resource (i.e., a resource different from the resource required by the first input token) that is unavailable. In the case in which the second resource required by the second input token is unavailable, a second initiative token that includes the CID and OpCode of the second input token is generated in a sub-step (not shown) of step 920 analogous to step 914 in FIG. 9A and sent to a second wait queue (i.e., a wait queue different from wait queue 802 in FIGS. 8A-8B and not shown in FIGS. 8A-8B) in a sub-step (not shown) of step 920 analogous to step 916 in FIG. 9A. Furthermore, in a sub-step (not shown) of step 920 analogous to step 918 (see FIG. 9B), logic 801 (see FIGS. 8A-8B) updates the state in array 428 (see FIGS. 8A-8B) to the next state, determines and writes a next set of one or more extended state variables to array 428 (see FIGS. 8A-8B), and writes the E_Cmd included in the second input token to an entry of array 428 (see FIGS. 8A-8B) indicated by the value of the CID in the second input token (e.g., if the CID in the second input token has a value of N, then the E_Cmd in the second input token is written to the N-th entry of the EFSM context array). While the second initiative token is in the second wait queue, an output token corresponding to the second input token is not generated.

Subsequent to step 920 and prior to step 922, the resource required by the first input token becomes available and target 502 (see FIG. 8A) signals to resource management support function(s) 504 (see FIG. 8A) that credits are available (i.e., indicating that the resource required by the first input token has become available). In step 922, logic of wait queue 802 (see FIGS. 8A-8B) receives an indication from resource management support function(s) 504 (see FIGS. 8A-8B) that the resource required by the first input token is now available after having been unavailable. In step 924, in response to receiving the indication that the resource is available in step 922, logic of wait queue 802 (see FIGS. 8A-8B) dequeues the initiative token from wait queue 802 (see FIGS. 8A-8B).

In step 926, the dequeued initiative token enters pipeline 420 (see FIGS. 8A-8B) via input FIFO 414 (see FIGS. 8A-8B) and is processed by logic 801 (see FIGS. 8A-8B). The processing of the initiative token includes fetching a current state and C_ES from array 428 (see FIGS. 8A-8B). In step 928, logic 801 (see FIGS. 8A-8B) generates the output token resulting from the processing of the initiative token and based on the state and extended state variables fetched from array 428 (see FIGS. 8A-8B) in step 926, the contents of the OpC field (i.e., field 876 in FIG. 8B), and the indication received in step 922 that the required resource is available. In step 930, logic 801 (see FIGS. 8A-8B) updates array 428 (see FIG. 6) with a next state (i.e., an update of the current state fetched in step 926), but the extended state variable(s) are not updated. In step 932, logic 801 (see FIGS. 8A-8B) selects an output register and loads the selected output register with the output token data included in the output token generated in step 928. Logic 801 (see FIGS. 8A-8B) sends the output token data to target 502 (see FIGS. 8A-8B). The process of FIGS. 9A-9B ends at step 934.

Figure 9C:
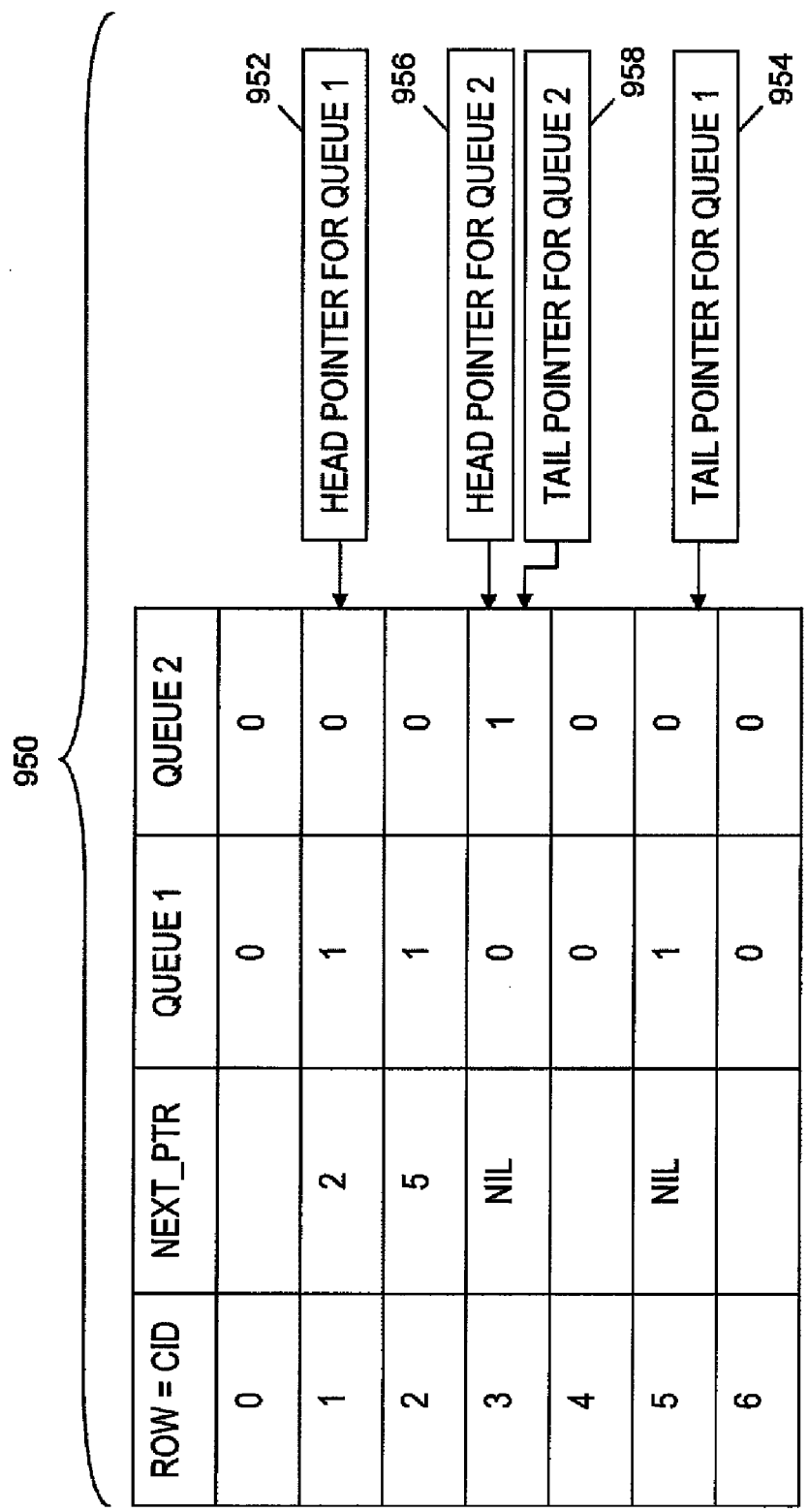
FIG. 9C depicts an example of wait queues included in the system of FIGS. 8A-8B in accordance with embodiments of the present invention.

FIG. 9C depicts an example of wait queues included in the system of FIGS. 8A-8B in accordance with embodiments of the present invention. A wait queue example 950 includes an example of wait queue 802 (see FIGS. 8A-8B). Wait queue example 950 illustrates two linked lists that implement two wait queues (i.e., QUEUE 1 and QUEUE 2). Each entry (i.e., row) in wait queue example 950 includes a CID value which equals the number of the row, a pointer (i.e., NEXT_PTR) to the next element of the linked list, an indicator that indicates whether the CID in the row corresponds to QUEUE 1, and an indicator that indicates whether the CID in the row corresponds to QUEUE 2.

A head pointer 952 points to a first element (i.e., the entry in row 1 in FIG. 9C) of a first linked list associated with QUEUE 1. The first element of the first linked list includes the CID value of 1 and a NEXT_PTR value of 2, which indicates that the next (i.e., second) element of the first linked list is the entry in row 2. The first element of the first linked list also includes a value of 1 in the QUEUE 1 column as an indicator that the CID value of 1 (i.e., row 1) corresponds to QUEUE 1. The zero value in the QUEUE 2 column of row 1 indicates that the CID value of 1 does not correspond to QUEUE 2. The second element of the first linked list in row 2 includes the CID value of 2 and includes the NEXT_PTR value of 5, which indicates that the next (i.e., third) element of the first linked list is the entry in row 5. The second element of the first linked list also includes a 1 in the QUEUE 1 column as the indicator that the CID value of 2 (i.e., row 2) corresponds to QUEUE 1. The zero value in the QUEUE 2 column of row 2 indicates that the CID value of 2 does not correspond to QUEUE 2. The third element of the first linked list (i.e., the entry in row 5) includes the CID value of 5 and a NEXT_PTR value of NIL, which indicates that the third element is the last element of the first linked list. The third element of the first linked list also includes a 1 in the QUEUE 1 column as the indicator that the CID value of 5 (i.e., row 5) corresponds to QUEUE 1. The zero value in the QUEUE 2 column of row 5 indicates that the CID value of 5 does not correspond to QUEUE 2. A tail pointer 954 points to the entry in row 5 to indicate the last element of the first linked list.

A head pointer 956 points to a first element (i.e., the entry in row 3 in FIG. 9C) of a second linked list, which is associated with QUEUE 2. The first element of the second linked list includes a CID value of 3 and a NEXT_PTR value of NIL, which indicates that the first element of the second linked list is also the last element of the second linked list. The first element of the second linked list also includes a value of 0 in the QUEUE 1 column as an indicator that the CID value of 3 (i.e., row 3) does not correspond to QUEUE 1. The value of 1 in the QUEUE 2 column of row 3 indicates that the CID value of 3 corresponds to QUEUE 2. A tail pointer 958 points to the entry in row 3 to indicate the last element of the second linked list.

Any given CID in an implementation of multiple wait queues is included in only one of the wait queues at a time. For example, there is no more than one value of 1 in the QUEUE 1 and QUEUE 2 columns of each row in wait queue example 950, thereby indicating that no CID value is associated with both QUEUE 1 and QUEUE 2.

In one embodiment, the size of the implemented wait queue(s) is identical to the size of the context array and therefore, the row number of an implementation of wait queues corresponds to a CID value. For example, as shown in FIG. 9C, row number 1 corresponds to a CID value of 1, row number 2 corresponds to a CID value of 2, etc. In this case, the wait queue only needs the Next_PTR and the Queue indicator fields. No OpCode field is required to be stored in the wait queue. The OpCode field indicating an initiative token will be generated by logic 802 (see FIGS. 8A-8B) at the time an element is dequeued from the wait queue.

An empty wait queue may be indicated by a NIL value in the head pointer or by indicators included in other queue implementations known to those skilled in the art.

Wait Queue(S) & Wait Room

In one embodiment, the present invention includes a system (not shown) (a.k.a. wait room/wait queue system) that includes a wait room and one or more wait queues (e.g., a version of a wait room, as described below, the wait queue in FIG. 8A, and optionally one or more other wait queues not shown in FIG. 8A or FIG. 8B). In the system that includes a wait room and one or more wait queues, input tokens may be processed according to the process of FIGS. 9A-9B until there is a potential overwrite of a needed entry in the EFSM context array 428 (see, e.g., FIG. 8A) caused by two different input tokens having the same CID value. The potential overwrite occurs in a case in which a first input token that includes a CID value of N is processed so that a first initiative token is derived from the first input token and is written to wait queue 802 (see FIG. 8A) and the E_Cmd in the first input token is written to the N-th entry of the EFSM context array. Subsequent to the processing of the first input token, a second input token arrives in the pipeline 420 (see FIG. 8A), where the second input token includes a same CID value of N, and the first initiative token is still in the wait queue 802 (see FIG. 8A). Instead of the E_Cmd of the second input token overwriting the N-th entry of the EFSM context array, the complete second input token, which includes the CID, OpCode and E_Cmd of the second input token, is written to a wait room (instead of to a wait queue). The complete second input token is written to the wait room even if the following steps occur prior to the arrival of the second input token at the pipeline: (1) the CID value of the first input token is taken out of a first wait queue because a first resource required by the first input token becomes available, and (2) the CID value is placed in a second wait queue because a second resource required by the first input token is unavailable.

In the wait room/wait queue system, the wait room is a second version of a wait room that differs from wait room 602 (see FIG. 6) relative to dequeuing. In this section that describes the wait room/wait queue system, the term "wait room" without any other qualification refers to the second version of the wait room. In one embodiment, an initiative token having a CID value of N is in the wait queue and one or more input tokens are in the wait room. In response to step 924 (see FIG. 9B) dequeuing the initiative token from the wait queue, the dequeued initiative token enters the pipeline and the EFSM logic processes the dequeued initiative token, generates a corresponding output token, and signals to the wait room indicating that an input token in the wait room that has a CID value of N is eligible to be sent to an input queue to the EFSM pipeline. In response to receiving the message from the EFSM logic, logic of the wait room dequeues an input token that has a CID value of N to the pipeline (if there is such an input token in the wait room). The dequeued input token includes a special flag that allows the input token to be identified as coming from the wait room and, for example, not from the packet receive queue 110 (see FIG. 1). The EFSM logic processes the input token having the special flag, generates a corresponding output token, and again signals to the wait room indicating that an input token in the wait room that has a CID value of N is eligible to be sent to the pipeline. If the wait room has a next input token that has the CID value of N, then the wait room logic sends the next input token to the pipeline with the special flag and the processing by the EFSM logic repeats. If the wait room does not have a next input token that has the CID value of N, then no input token is dequeued. Note that in a case in which there are several input tokens for CID N sitting in the wait room, the order in which these input tokens are dequeued from the wait room is the same order as these input tokens have been written into the wait room. Input tokens associated with different CIDs may be dequeued in a different order than originally written into the wait room.

In the wait room/wait queue system, the wait room is configured differently from wait room 602 (see FIG. 6). The wait room in the wait room/wait queue system is organized as multiple linked lists. In addition to the head and tail pointers, there is a CID register available for each of the linked lists. If the wait room is empty, the CID fields of the linked lists have "don't care" values. If an input token that includes a CID with a value of N is to be put into the wait room, the following steps occur:

1. The wait room logic checks if there is a non-empty linked list that includes input token(s) that each include a CID value of N. If there is such a non-empty linked list, the wait room logic writes the input token to the tail of the non-empty linked list.

2. If step 1 does not find a non-empty linked list that includes input token(s) that each include a CID value of N, the wait room logic allocates an empty linked list for the CID value of N and writes the CID value of N to the corresponding CID field of the newly allocated linked list.

In the wait room/wait queue system, the pipeline needs to be stalled in two cases:

1. there is no free entry in the wait room; or
2. there is no free linked list in the wait room.

EXAMPLE 1

As a first example of steps performed in the process of FIGS. 9A-9B, a first input token (i.e., first packet) is received in step 902 (see FIG. 9A) and arrives at the pipeline in step 904 (see FIG. 9A). The CID (i.e., CID 5) included in the first input token has a value of 5, but the resource R2 required by CID 5 is unavailable (see steps 910 and 912 in FIG. 9A). The E_Cmd included in the first input token is written to entry 5 of the EFSM context array (see step 918 in FIG. 9B) and CID 5 is enqueued to Wait Queue 2, which is associated with resource R2 (see step 916 of FIG. 9A). An output token corresponding to the first input token is not generated (see step 918 in FIG. 9B). At a later time, resource R2 becomes available and an initiative token is dequeued from Wait Queue 2 and then enters the EFSM pipeline (see steps 924 and 926 in FIG. 9B). The aforementioned E_Cmd is read from the EFSM context array (see step 926 in FIG. 9B) and the required action is performed (i.e., a first output token corresponding to the first input token is generated) (see step 928 in FIG. 9B).

EXAMPLE 2

As a second example in which wait queues and a wait room are implemented, a second input token (i.e., second packet) arrives at the EFSM pipeline (see step 904 in FIG. 9A) following the arrival of the first input token described in Example 1 presented above. The CID included in the second input token is again CID 5. The E_Cmd included in the first input token is written to entry 5 of the EFSM context array (see Example 1) and CID 5 is still waiting in Wait Queue 2 subsequent to the enqueuing step in Example 1 (i.e., the resource R2 has not yet become available). To prevent the existing entry 5 of the EFSM context array from being lost, the E_Cmd included in the second input token does not overwrite the existing entry 5 of the EFSM context array. Instead of utilizing Wait Queue 2 (or another wait queue), the complete second input token is written to a wait room. It should be noted that the resource requirements for a single entry in the wait room is significantly larger than a single entry in the wait queue. For instance, in the PCI Express protocol, a header typically consists of 12 to 16 bytes.

Computer System

Figure 10:
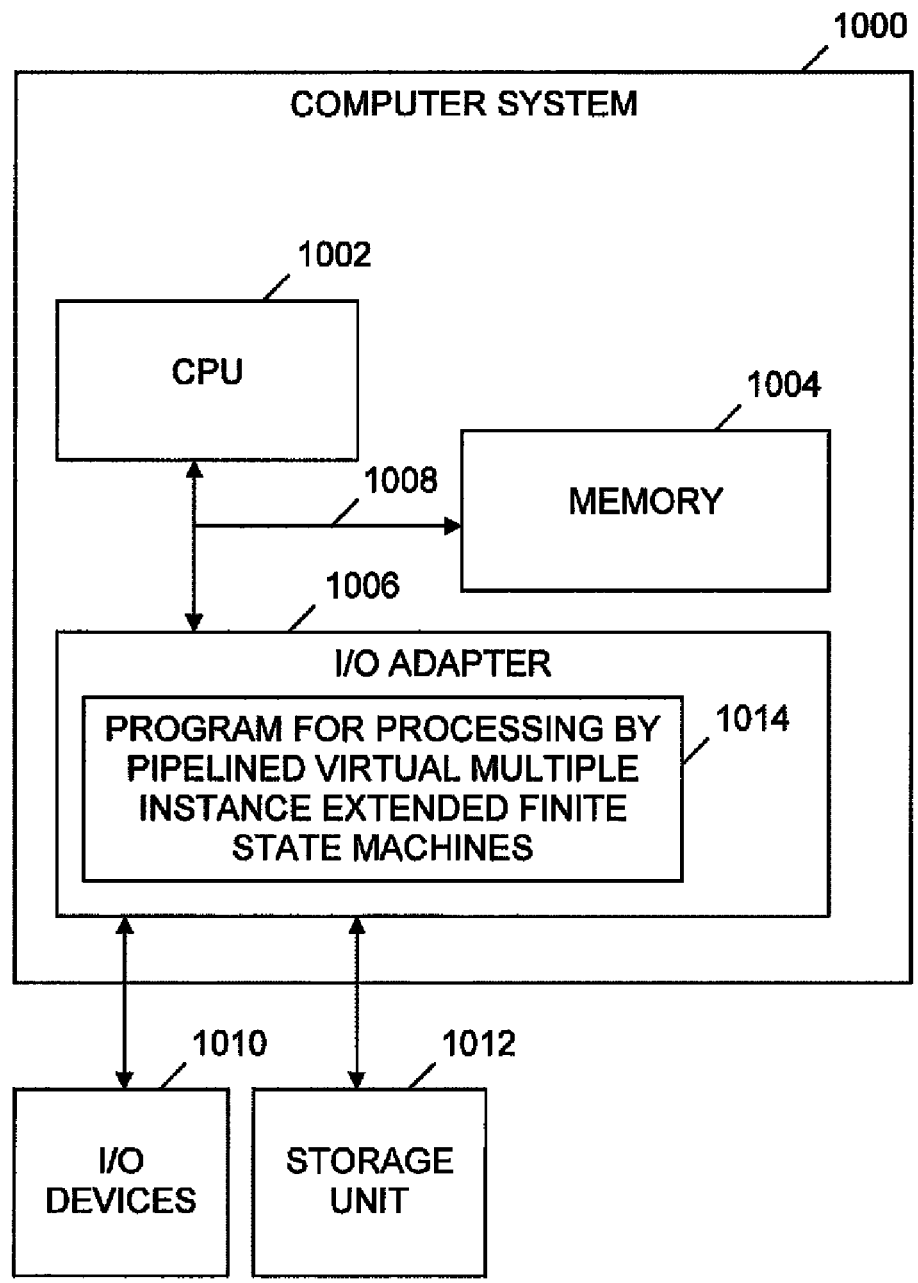
FIG. 10 is a computer system that implements one or more of the processes of FIGS. 7A-7B and FIGS. 9A-9B, in accordance with embodiments of the present invention.

FIG. 10 is a computer system that implements one or more of the processes of FIGS. 7A-7B and FIGS. 9A-9B, in accordance with embodiments of the present invention. Computer system 1000 generally comprises a central processing unit (CPU) 1002, a memory 1004, an input/output (I/O) adapter 1006, and a bus 1008. In one embodiment, computer system 1000 implements a pipelined VMI EFSM including logic 601 (see FIG. 6) or logic 801 (see FIGS. 8A-8B). Further, computer system 1000 is coupled to I/O devices 1010 and a computer data storage unit 1012. CPU 1002 performs computation and control functions of computer system 1000. CPU 1002 may comprise a single processing unit, or be distributed across one or more processing units in one or more locations (e.g., on a client and server).

Memory 1004 may comprise any known computer readable storage medium, which is described below. In one embodiment, cache memory elements of memory 1004 provide temporary storage of at least some program code (not shown) in order to reduce the number of times code must be retrieved from bulk storage during execution. Moreover, similar to CPU 1002, memory 1004 may reside at a single physical location, comprising one or more types of data storage, or be distributed across a plurality of physical systems in various forms. Further, memory 1004 can include data distributed across, for example, a local area network (LAN) or a wide area network (WAN). Still further, memory 1004 may include systems not shown in FIG. 10, such as an operating system (e.g., Linux) that runs on CPU 1002 and provides control of various components within and/or connected to computer system 1000.

I/O adapter 1006 comprises any system for exchanging information to or from an external source such as I/O devices 1010. Examples of I/O adapter 1006 include an InfiniBand, PCI Express, Fibre Channel or Ethernet networking adapter. I/O devices 1010 comprise any known type of external device, including a display device (e.g., monitor), keyboard, mouse, printer, speakers, handheld device, facsimile, etc. Bus 1008 provides a communication link between each of the components in computer system 1000, and may comprise any type of transmission link, including electrical, optical, wireless, etc.

I/O adapter 1006 also allows computer system 1000 to store and retrieve information (e.g., data or program instructions) from an auxiliary storage device such as computer data storage unit 1012 or another computer data storage unit (not shown). Computer data storage unit 1012 may comprise any known computer readable storage medium, which is described below. For example, computer data storage unit 1012 may be a non-volatile data storage device, such as a magnetic disk drive (i.e., hard disk drive) or an optical disc drive (e.g., a CD-ROM drive which receives a CD-ROM disk) or it may be storage units accessed via a Storage Area Network.

I/O adapter 1006 may include logic 1014 for processing by a pipelined VMI EFSM that uses a wait room and/or wait queue(s) (e.g., the process of FIGS. 7A-7B and/or the process of FIGS. 9A-9B).

I/O adapter 1006 or memory 1004 may store EFSM context array 428 (see FIG. 6 and FIGS. 8A-8B), wait room 602 (see FIG. 6), wait queue 802 (see FIGS. 8A-8B), MMIO queue 104 (see FIG. 1 and FIG. 3), packet receive queue 110 (see FIG. 1 and FIG. 3), and/or packet send queue 120 (see FIG. 1 and FIG. 3).

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1, system 300 in FIG. 3, system 600 in FIG. 6, system 800 in FIG. 8A, system 850 in FIG. 8B, or computer system 1000). Furthermore, an embodiment of the present invention may take the form of a computer program product embodied in one or more computer readable medium(s) (e.g., I/O adapter 1006, memory 1004 or computer data storage unit 1012) having computer readable program code (e.g., program code 1014) embodied or stored thereon.

Any combination of one or more computer readable medium(s) (e.g., I/O adapter 1006, memory 1004 and computer data storage unit 1012) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus, device or any suitable combination of the foregoing. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code (e.g., program code 1014) embodied on a computer readable medium may be transmitted using any appropriate medium, including but not limited to wireless, wireline, optical fiber cable, RF, etc., or any suitable combination of the foregoing.

Computer program code (e.g., program code 1014) for carrying out operations for aspects of the present invention may be written in any combination of one or more programming languages, including an object oriented programming language such as Java®, Smalltalk, C++or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server, where the aforementioned user's computer, remote computer and server may be, for example, computer system 1000 or another computer system (not shown) having components analogous to the components of computer system 1000 included in FIG. 10. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 7A-7B and FIGS. 9A-9B) and/or block diagrams of methods, apparatus (systems) (e.g., FIGS. 1, 3, 6, and 8A-8B), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1014). These computer program instructions may be provided to a processor (e.g., CPU 1002) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium (e.g., I/O adapter 1006, memory 1004 or computer data storage unit 1012) that can direct a computer (e.g., computer system 1000), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 1000), other programmable data processing apparatus, or other devices to cause a series of operational steps to be performed on the computer, other programmable apparatus, or other devices to produce a computer implemented process such that the instructions which execute on the computer, other programmable apparatus, or other devices provide processes for implementing the functions/acts specified in the flowchart and/or block diagram block or blocks.

In an alternate embodiment, computer system 1000 does not include program 1014, but further comprises a processor coupled to a computer-readable storage medium that includes array 428 (see FIG. 6 and FIGS. 8A-8B). The processor includes one or more logic circuits that include one or more blocks of combinational logic that when executed by the processor implement the processing of data by a pipeline of a VMI EFSM that uses wait room 602 (see FIG. 6) and/or wait queue(s) such as wait queue 802 (see FIGS. 8A-8B), where the processing is included in the method of FIGS. 7A-7B and/or the method of FIGS. 9A-9B.

In another alternate embodiment, computer system 1000 does not include program 1014, but further includes a logic circuit that includes multiple interconnected electrically conductive elements that provide combinational logic that when executed by the logic circuit implement the method of FIGS. 7A-7B and/or the method of FIGS. 9A-9B.

Any of the components of an embodiment of the present invention can be deployed, managed, serviced, etc. by a service provider that offers to deploy or integrate computing infrastructure with respect to the processing by pipelined virtual multiple instance extended finite state machines using wait rooms and/or wait queues. Thus, an embodiment of the present invention discloses a process for supporting computer infrastructure, comprising integrating, hosting, maintaining and deploying computer-readable code (e.g., program code 1014) into a computer system (e.g., computer system 1000), wherein the code in combination with the computer system is capable of performing processing by pipelined virtual multiple instance extended finite state machines that use wait rooms and/or wait queue(s).

In another embodiment, the invention provides a business method that performs the process steps of the invention on a subscription, advertising and/or fee basis. That is, a service provider, such as a Solution Integrator, can offer to create, maintain, support, etc. processing by pipelined virtual multiple instance extended finite state machines using wait rooms and/or wait queue(s). In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 7A-7B and 9A-9B and the block diagrams in FIGS. 1, 3, 6, and 8A-8B illustrate the architecture, functionality, and operation of possible implementations of systems, methods, and computer program products according to various embodiments of the present invention. In this regard, each block in the flowchart or block diagrams may represent a module, segment, or portion of code (e.g., program code 1014), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A logic circuit-implemented method of processing data by a pipeline of a virtual multiple instance extended finite state machine (VMI EFSM), said method comprising:

receiving a plurality of input tokens referencing a plurality of EFSM instances included in said VMI EFSM;

selecting a first input token of said plurality of input tokens to enter said pipeline of said VMI EFSM, wherein said first input token includes a first field that includes a reference to a first EFSM instance of said plurality of EFSM instances, a second field that includes an extended command, and a third field that includes an operation code, and wherein a generation of a first output token from said first input token by said first EFSM instance requires a resource to be available;

receiving said first input token at said pipeline of said VMI EFSM;

fetching a current state of said first EFSM instance and one or more extended state variables of said first EFSM instance from an array based on said reference included in said first field of said first input token;

inserting said current state of said first EFSM instance and said one or more extended state variables of said first EFSM instance into one or more other fields of said first input token;

determining a next state of said first EFSM instance as an update of said current state;

receiving a first indication from a resource management support function that said resource is unavailable;

responsive to said receiving said indication that said resource is unavailable, sending said first input token to a wait room, wherein said first output token is not generated by said first EFSM instance while said first input token is in said wait room and while said resource is unavailable;

writing said next state of said first EFSM instance to said array; and a logic circuit implementing said VMI EFSM processing one or more other input tokens in said pipeline while said first input token is in said wait room and while said resource is unavailable, wherein said processing said one or more other input tokens includes generating one or more other output tokens without requiring said resource to be available.

2. The method of claim 1, further comprising:

subsequent to said processing said one or more other input tokens, receiving a second indication from said resource management support function that said resource is available; and responsive to said receiving said second indication that said resource is available, dequeuing said first input token from said wait room.

3. The method of claim 2, further comprising:

subsequent to said dequeuing said first input token, said first input token entering said pipeline; and subsequent to said entering said pipeline, said first EFSM instance processing said first input token, wherein said processing said first input token includes generating said first output token.

4. The method of claim 1, wherein said processing said one or more other input tokens is performed without requiring said pipeline to be stalled and restarted prior to said processing said one or more other input tokens.

5. A logic circuit of multiple interconnected electrically conductive elements configured to perform a method of processing data by a pipeline of a virtual multiple instance extended finite state machine (VMI EFSM), said logic circuit comprising:

a plurality of input first-in-first-out (FIFO) buffers and a scheduler receiving a plurality of input tokens referencing a plurality of EFSM instances included in said VMI EFSM;

said scheduler selecting a first input token of said plurality of input tokens to enter said pipeline of said VMI EFSM, wherein said first input token includes a first field that includes a reference to a first EFSM instance of said plurality of EFSM instances, a second field that includes an extended command, and a third field that includes an operation code, and wherein a generation of a first output token from said first input token by said first EFSM instance requires a resource to be available;

said pipeline receiving said first input token;

said pipeline fetching a current state of said first EFSM instance and one or more extended state variables of said first EFSM instance from an array based on said reference included in said first field of said first input token;

said pipeline inserting said current state of said first EFSM instance and said one or more extended state variables of said first EFSM instance into one or more other fields of said first input token;

said pipeline determining a next state of said first EFSM instance as an update of said current state;

said pipeline receiving a first indication from a resource management support function that said resource is unavailable;

responsive to said receiving said indication that said resource is unavailable, said pipeline sending said first input token to a wait room, wherein said first output token is not generated by said first EFSM instance while said first input token is in said wait room and while said resource is unavailable;

said pipeline writing said next state of said first EFSM instance to said array; and said pipeline processing one or more other input tokens in said pipeline while said first input token is in said wait room and while said resource is unavailable, wherein said processing said one or more other input tokens includes generating one or more other output tokens without requiring said resource to be available.

6. The logic circuit of claim 5, further comprising:

subsequent to said processing said one or more other input tokens, said wait room receiving a second indication from said resource management support function that said resource is available; and responsive to said receiving said second indication that said resource is available, said wait room dequeuing said first input token from said wait room.

7. The logic circuit of claim 6, further comprising:

subsequent to said dequeuing said first input token, said first input token entering said pipeline; and subsequent to said entering said pipeline, said first EFSM instance processing said first input token, wherein said processing said first input token includes generating said first output token.

8. The logic circuit of claim 5, wherein said processing said one or more other input tokens is performed without requiring said pipeline to be stalled and restarted prior to said processing said one or more other input tokens.

9. A computer system comprising a processor that includes the logic circuit of claim 5.

10. A logic circuit-implemented method of processing data by a pipeline of a virtual multiple instance extended finite state machine (VMI EFSM), said method comprising:

receiving a plurality of input tokens referencing a plurality of EFSM instances included in said VMI EFSM;

selecting a first input token of said plurality of input tokens to enter said pipeline of said VMI EFSM, wherein said first input token includes a first field that includes a reference to a first EFSM instance of said plurality of EFSM instances, a second field that includes an extended command, and a third field that includes an operation code, wherein a generation of a first output token from said first input token by said first EFSM instance requires a resource to be available, and wherein a processing of said extended command does not require said resource to be available;

receiving said first input token at said pipeline of said VMI EFSM;

fetching a current state of said first EFSM instance and one or more extended state variables of said first EFSM instance from an array based on said reference included in said first field of said first input token;

inserting said current state of said first EFSM instance and said one or more extended state variables of said first EFSM instance into one or more other fields of said first input token;

receiving a first indication from a resource management support function that said resource is unavailable;

responsive to said receiving said indication that said resource is unavailable, generating an initiative token containing said reference to said first EFSM instance and said operation code;

sending said initiative token to a wait queue, wherein said first output token is not generated by said first EFSM instance while said initiative token is in said wait queue and while said resource is unavailable;

determining a next state of said first EFSM instance as an update of said current state;

determining a next one or more extended state variables of said first EFSM instance as an update of said one or more extended state variables;

writing said next state of said first EFSM instance and said next one or more extended state variables of said first EFSM instance to said array; and a logic circuit implementing said VMI EFSM processing one or more other input tokens in said pipeline while said initiative token is in said wait queue and while said resource is unavailable, wherein said processing said one or more other input tokens includes generating one or more other output tokens without requiring said resource to be available.

11. The method of claim 10, further comprising:

subsequent to said processing said one or more other input tokens, receiving a second indication from said resource management support function that said resource is available; and responsive to said receiving said second indication that said resource is available, dequeuing said initiative token from said wait queue.

12. The method of claim 11, further comprising:

subsequent to said dequeuing said initiative token, said initiative token entering said pipeline;

subsequent to said entering said pipeline, said first EFSM instance processing said initiative token, wherein said processing said initiative token includes generating said first output token;

determining a second next state of said first EFSM instance; and writing said second next state of said first EFSM instance to said array without updating said next one or more extended state variables of said first EFSM instance.

13. The method of claim 10, wherein said processing said one or more other input tokens is performed without requiring said pipeline to be stalled and restarted prior to said processing said one or more other input tokens.

14. The method of claim 10, further comprising prior to said generating said initiative token, determining that a processing of said extended command does not require said resource to be available.

15. A logic circuit of multiple interconnected electrically conductive elements configured to perform a method of processing data by a pipeline of a virtual multiple instance extended finite state machine (VMI EFSM), said logic circuit comprising:

a plurality of input FIFO buffers and a scheduler receiving a plurality of input tokens referencing a plurality of EFSM instances included in said VMI EFSM;

said scheduler selecting a first input token of said plurality of input tokens to enter said pipeline of said VMI EFSM, wherein said first input token includes a first field that includes a reference to a first EFSM instance of said plurality of EFSM instances, a second field that includes an extended command, and a third field that includes an operation code, wherein a generation of a first output token from said first input token by said first EFSM instance requires a resource to be available, and wherein a processing of said extended command does not require said resource to be available;

said pipeline receiving said first input token;

said pipeline fetching a current state of said first EFSM instance and one or more extended state variables of said first EFSM instance from an array based on said reference included in said first field of said first input token;

said pipeline inserting said current state of said first EFSM instance and said one or more extended state variables of said first EFSM instance into one or more other fields of said first input token;

said pipeline receiving a first indication from a resource management support function that said resource is unavailable;

responsive to said receiving said indication that said resource is unavailable, said pipeline generating an initiative token containing said reference to said first EFSM instance and said operation code;

said pipeline sending said initiative token to a wait queue, wherein said first output token is not generated by said first EFSM instance while said initiative token is in said wait queue and while said resource is unavailable;

said pipeline determining a next state of said first EFSM instance as an update of said current state;

said pipeline determining a next one or more extended state variables of said first EFSM instance as an update of said one or more extended state variables;

said pipeline writing said next state of said first EFSM instance and said next one or more extended state variables of said first EFSM instance to said array; and said pipeline processing one or more other input tokens in said pipeline while said initiative token is in said wait queue and while said resource is unavailable, wherein said processing said one or more other input tokens includes generating one or more other output tokens without requiring said resource to be available.

16. The logic circuit of claim 15, further comprising:

subsequent to said processing said one or more other input tokens, said wait queue receiving a second indication from said resource management support function that said resource is available; and responsive to said receiving said second indication that said resource is available, said wait queue dequeuing said initiative token from said wait queue.

17. The logic circuit of claim 16, further comprising:

subsequent to said dequeuing said initiative token, said initiative token entering said pipeline;

subsequent to said entering said pipeline, said first EFSM instance processing said initiative token, wherein said processing said initiative token includes generating said first output token;

said pipeline determining a second next state of said first EFSM instance; and said pipeline writing said second next state of said first EFSM instance to said array without updating said next one or more extended state variables of said first EFSM instance.

18. The logic circuit of claim 15, wherein said processing said one or more other input tokens is performed without requiring said pipeline to be stalled and restarted prior to said processing said one or more other input tokens.

19. The logic circuit of claim 15, wherein said method further comprises prior to said generating said initiative token, determining that a processing of said extended command does not require said resource to be available.

20. A computer system comprising a processor that includes the logic circuit of claim 15.

* * * * *